(12) United States Patent
Ikeda et al.

(10) Patent No.: US 12,530,074 B2
(45) Date of Patent: Jan. 20, 2026

(54) INFORMATION PROCESSING DEVICE, INFORMATION PROCESSING METHOD, AND PROGRAM

(71) Applicant: SONY GROUP CORPORATION, Tokyo (JP)

(72) Inventors: Tetsuo Ikeda, Tokyo (JP); Atsushi Irie, Kanagawa (JP); Kenji Gotoh, Chiba (JP); Yohsuke Kaji, Chiba (JP); Eisuke Fujinawa, Tokyo (JP); Seishi Tomonaga, Kanagawa (JP); Tadayoshi Murakami, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 68 days.

(21) Appl. No.: 17/773,439

(22) PCT Filed: Nov. 13, 2020

(86) PCT No.: PCT/JP2020/042378
§ 371 (c)(1),
(2) Date: Apr. 29, 2022

(87) PCT Pub. No.: WO2021/106614
PCT Pub. Date: Jun. 3, 2021

(65) Prior Publication Data
US 2022/0377294 A1    Nov. 24, 2022

(30) Foreign Application Priority Data
Nov. 29, 2019   (JP) .................................. 2019-216097

(51) Int. Cl.
*G06F 3/01*     (2006.01)
*B60K 35/10*    (2024.01)
(Continued)

(52) U.S. Cl.
CPC .............. *G06F 3/011* (2013.01); *B60K 35/10* (2024.01); *B60K 35/53* (2024.01); *B60K 35/60* (2024.01);
(Continued)

(58) Field of Classification Search
CPC ................... G06F 3/011; G06F 3/0484; B60K 2370/1523; B60K 2370/1529;
(Continued)

(56) References Cited

U.S. PATENT DOCUMENTS

2017/0171497 A1* 6/2017 Kang ..................... H04N 7/147
2017/0349183 A1  12/2017 Sen
(Continued)

FOREIGN PATENT DOCUMENTS

CN          107458378 A      12/2017
DE       102015223367 A1     6/2017
(Continued)

*Primary Examiner* — Andrey Belousov
(74) *Attorney, Agent, or Firm* — Paratus Law Group, PLLC

(57) ABSTRACT

There is provided an information processing device, an information processing method, and a program that enable information presentation with high usability. On the basis of presentation location information regarding a change in state of a presentation location where presentation information is presented and at least one piece of information out of processing information regarding processing for generating the presentation information, user information regarding a response of a user to the processing, and environment information regarding a state of an environment of the presentation location, control of at least one state of a presentation state of the presentation information and a state of the processing is performed. The present technology can be applied as a projection device for the inside of a vehicle, a conference room, or the like.

21 Claims, 39 Drawing Sheets

(51) Int. Cl.
  *B60K 35/53* (2024.01)
  *B60K 35/60* (2024.01)
  *B60K 35/81* (2024.01)
  *B60K 37/20* (2024.01)
  *B60K 35/22* (2024.01)
  *B60K 35/28* (2024.01)
(52) U.S. Cl.
  CPC .............. *B60K 35/81* (2024.01); *B60K 37/20* (2024.01); *B60K 35/223* (2024.01); *B60K 35/28* (2024.01)
(58) Field of Classification Search
  CPC ...... B60K 2370/1533; B60K 2370/182; B60K 2370/1876; B60K 2370/67; B60K 37/06; B60K 35/00
  See application file for complete search history.

(56) References Cited

U.S. PATENT DOCUMENTS

| | | | |
|---|---|---|---|
| 2019/0232786 A1 | 8/2019 | Sasaki | |
| 2021/0354711 A1* | 11/2021 | Kim | ........................ B60R 11/02 |

FOREIGN PATENT DOCUMENTS

| | | | | |
|---|---|---|---|---|
| JP | 2010-086014 A | 4/2010 | | |
| JP | 2015-529873 A | 10/2015 | | |
| JP | 2018-133019 A | 8/2018 | | |
| JP | 2019-082973 A | 5/2019 | | |
| JP | 2019082973 | * 5/2019 | ............. | G03B 21/00 |
| JP | 2019130971 A | 8/2019 | | |
| WO | WO 2019/069575 A1 | 4/2019 | | |

\* cited by examiner

| APP TYPE | APP STATE | TRIGGER | URGENCY LEVEL | ACTION |
|---|---|---|---|---|
| | | | | |
| | | | | |
| | | | | |
| | | | | |

| APP STATE | MEANING |
|---|---|
| CURRENTLY OPERATED | WHETHER USER IS PERFORMING OPERATION |
| CURRENTLY VIEWED | WHETHER USER IS VIEWING PRESENTATION INFORMATION |
| CURRENTLY REPLAYED | WHETHER CONTENT IS BEING REPLAYED |
| ORDINARY | STATE IN WHICH NOTHING IS BEING DONE |

Fig. 4

| URGENCY LEVEL | MEANING |
|---|---|
| Critical | STATE IN WHICH NON-IMMEDIATE EXECUTION OF ACTION LEAD TO PHYSIOLOGICAL ISSUE (PROBLEM MAY OCCUR IN DRIVING OR LIKE) |
| Major | THERE IS PROBABILITY THAT CONTINUATION OF SAME TIME FOR LONG PERIOD OF TIME MAY LEAD TO PHYSIOLOGICAL ISSUE (SUCH AS BREAKING OF DRUM MEMBRANE DUE TO LARGE VOLUME OR CARSICK) |
| Minor | STATE THAT BRINGS INCONVENIENCE OF USER |
| Trivial | STATE IN WHICH NO ACTION MAY BE REQUIRED TO BE EXECUTED |

Fig. 11

| APP TYPE | APP STATE | TRIGGER | URGENCY LEVEL | ACTION |
|---|---|---|---|---|
| R11 → WEATHER FORECAST APP | CURRENTLY OPERATED | ARMREST IS SHIFTED | Minor | APP WINDOW SLIDES TOGETHER WITH ARMREST |
| R12 → WEATHER FORECAST APP | CURRENTLY VIEWED | ARMREST IS SHIFTED | Minor | APP WINDOW SLIDES TOGETHER WITH ARMREST |
| R13 → WEATHER FORECAST APP | ORDINARY | ARMREST IS SHIFTED | Trivial | NOTHING IS DONE, AND DISPLAY IS MISSED |

Fig. 15

| APP TYPE | APP STATE | TRIGGER | URGENCY LEVEL | ACTION |
|---|---|---|---|---|
| MUSIC APP | CURRENTLY REPLAYED (AT SPECIFIC VOLUME OR MORE) | HAND IS PLACED ON ARMREST | Critical | ALERT SUCH AS "IF YOU SLIDE THIS, YOU CANNOT PERFORM ANY OPERATION, AND IT MAY BE RISKY" IS DISPLAYED IN RESPONSE TO ACTION OF USER TRYING TO SHIFT ARMREST. |
| MUSIC APP | CURRENTLY REPLAYED (AT SPECIFIC VOLUME OR MORE) | ARMREST IS SHIFTED | Critical | MUSIC IS TEMPORARILY PAUSED IF ARMREST HAS BEEN SHIFTED REGARDLESS OF ALERT. |
| MUSIC APP | CURRENTLY REPLAYED (AT VOLUME LESS THAN SPECIFIC VOLUME) | ARMREST IS SHIFTED | Major | ICON IS MADE BECAUSE ARMREST SHIFT HAS OCCURRED OUTSIDE PROJECTION REGION. GESTURE IN AIR ABOVE ICON BECOMES EFFECTIVE, AND USER CAN STOP MUSIC. |
| MUSIC APP | ORDINARY | ARMREST IS SHIFTED | Trivial | NOTHING IS TO BE DONE. |

| APP TYPE | APP STATE | TRIGGER | URGENCY LEVEL | ACTION |
|---|---|---|---|---|
| CAR NAVIGATION APP | ORDINARY (DRIVING) | PRESS DASHBOARD OPENING/ CLOSING BUTTON | Critical | IF USER TRIES TO OPEN DASHBOARD, ALERT SUCH AS "IF YOU OPEN THE DASHBOARD, YOU CANNOT SEE THE CAR NAVIGATION, WHICH MAY CAUSE A PROBLEM IN YOUR DRIVE AND MAY BE RISKY." IS DISPLAYED. DASHBOARD IS KEPT LOCKED UNTIL CAR STOPS. |
| CAR NAVIGATION APP | ORDINARY (STOPPING) | PRESS DASHBOARD OPENING/ CLOSING BUTTON | Trivial | NOTHING IS TO BE DONE. DASHBOARD CAN BE OPENED IN UNLOCKED STATE. |
| GOURMET APP | ORDINARY | PRESS DASHBOARD OPENING/ CLOSING BUTTON | Trivial | NOTHING IS TO BE DONE. BECAUSE THERE IS NO PROBLEM IN DRIVING DUE TO CHARACTERISTICS OF APP EVEN IF VIEWING AND OPERATION CANNOT BE PERFORMED |

| APP TYPE | APP STATE | TRIGGER | URGENCY LEVEL | ACTION |
|---|---|---|---|---|
| VIDEO APP | CURRENTLY REPLAYED | RECLINING IS PERFORMED | Major | IF USER PERFORMS RECLINING, IT IS POSSIBLE TO PREVENT CARSICK, AND SCREEN AND BUTTON ARE AUTOMATICALLY SWITCHED IN ACCORDANCE WITH INCLINATION. |
| VIDEO APP | ORDINARY | RECLINING IS PERFORMED | Trivial | NOTHING IS TO BE DONE. |
| WEATHER FORECAST APP | ORDINARY | RECLINING IS PERFORMED | Trivial | NOTHING IS TO BE DONE (BECAUSE USER DOES NOT KEEP PAYING CLOSE ATTENTION TO IT). |

R71 ← (row 1)
R72 ← (row 2)
R73 ← (row 3)

Fig. 32

| APP TYPE | APP STATE | TRIGGER | URGENCY LEVEL | ACTION |
|---|---|---|---|---|
| VIDEO APP | CURRENTLY REPLAYED | OPEN WINDOW | Major | SINCE VIDEO ADVANCES WHILE VIEWING IS NOT AVAILABLE DUE TO OPENED WINDOW, PRESENTATION IS TEMPORARILY STOPPED. |
| VIDEO APP | ORDINARY | OPEN WINDOW | Trivial | NOTHING IS TO BE DONE. |
| VIDEO APP | ORDINARY, REPLAYED | OPEN DOOR | Major | THERE IS PROBABILITY THAT PERSON MAY GET ON OR OFF VEHICLE SINCE DOOR IS OPENED. SINCE LIGHT FROM PROJECTOR ENTERING EYES FOR LONG PERIOD OF TIME IS RISKY, PRESENTATION IS TEMPORARILY STOPPED AND PROJECTOR IS TURNED OFF. |

R91 → (row 1)
R92 → (row 2)
R93 → (row 3)

Fig. 35

| APP TYPE | APP STATE | TRIGGER | URGENCY LEVEL | ACTION |
|---|---|---|---|---|
| MAP APP | CURRENTLY OPERATED | OPEN SUNROOF | Minor | WINDOW IS AUTOMATICALLY MOVED TO POSITION AT WHICH TARGET CAN VIEW PRESENTATION (MONITOR FOR FRONT SEAT OR HEADREST FOR REAR SEAT). |
| MAP APP | CURRENTLY VIEWED | OPEN SUNROOF | Minor | WINDOW IS AUTOMATICALLY MOVED TO POSITION AT WHICH TARGET CAN VIEW PRESENTATION (MONITOR FOR FRONT SEAT OR HEADREST FOR REAR SEAT). |
| MAP APP | ORDINARY | OPEN SUNROOF | Trivial | NOTHING IS TO BE DONE. |

| APP TYPE | APP STATE | TRIGGER | URGENCY LEVEL | ACTION |
|---|---|---|---|---|
| R121 DISCUSSION APP | ORDINARY (DURING DISCUSSION) | PLACE HANDS ON TABLE | Minor | IF USER TRIES TO SEPARATE TABLES, "DISCUSSION IS CURRENTLY CARRIED OUT. PLEASE DO NOT SEPARATE THE TABLES." IS DISPLAYED. |
| R122 DISCUSSION APP | ORDINARY (DURING DISCUSSION) | SEPARATE TABLES | Minor | IF TABLES ARE SEPARATED REGARDLESS OF ALERT, COPIES ARE LEFT IN REMAINING TABLE. NOTHING IS TO BE DONE ON SEPARATED TABLE. |
| R123 DISCUSSION APP | ORDINARY (AFTER DISCUSSION) | SEPARATE TABLES | Trivial | NOTHING IS TO BE DONE ON ASSUMPTION THAT NECESSARY STICKY NOTES HAVE ALREADY BEEN MOVED TO ANOTHER TABLE. |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/042378 (filed on Nov. 13, 2020) under 35 U.S.C. § 371, which claims priority to Japanese Patent Application No. 2019-216097 (filed on Nov. 29, 2019), which are all hereby incorporated by reference in their entirety.

TECHNICAL FIELD

The present technology relates to an information processing device, an information processing method, and a program, and more particularly, to an information processing device, an information processing method, and a program that present information with high usability.

BACKGROUND ART

PTL 1 discloses a technology for changing a size (a window size) of a projection image in accordance with a size of a projection surface on a table.

CITATION LIST

Patent Literature

[PTL 1]
WO 2019/069575

SUMMARY

Technical Problem

In a case in which a state such as a position of a presentation location where presentation information is presented has changed, there may be various situations. It is desirable to take measures in consideration of situations in the case in which the state of the presentation location has changed.

The present technology was made in view of such a circumstance and enables information presentation with high usability

Solution to Problem

An information processing device or a program according to an aspect of the present technology is an information processing device including: a control unit configured to perform, on the basis of presentation location information regarding a change in state of a presentation location where presentation information is presented and at least one piece of information out of processing information regarding processing for generating the presentation information, user information regarding a response of a user to the processing, and environment information regarding a state of an environment of the presentation location, control of at least one state of a presentation state of the presentation information and a state of the processing, or a program for causing a computer to function as such an information processing device.

An information processing method according to an aspect of the present technology is an information processing method including, by a control unit of an information processing device including the control unit: performing, on the basis of presentation location information regarding a change in state of a presentation location where presentation information is presented and at least one piece of information out of processing information regarding processing for generating the presentation information, user information regarding a response of a user to the processing, and environment information regarding a state of an environment of the presentation location, control of at least one state of a presentation state of the presentation information and a state of the processing.

According to the information processing device, the information processing method, and the program of the aspects of the present technology, on the basis of presentation location information regarding a change in state of a presentation location where presentation information is presented and at least one piece of information out of processing information regarding processing for generating the presentation information, user information regarding a response of a user to the processing, and environment information regarding a state of an environment of the presentation location, control of at least one state of a presentation state of the presentation information and a state of the processing is performed.

BRIEF DESCRIPTION OF DRAWINGS

FIG. 3 is a diagram illustrating, as an example, an app state definition table.

FIG. 4 is a diagram illustrating, as an example, an urgency level definition table.

FIG. 11 is a diagram illustrating, as an example, a record including a weather forecast app in an "app type" field in the action definition table stored in an action definition accumulation unit in FIG. 1.

FIG. 15 is a diagram illustrating, as an example, a record including a music app in the "app type" field in the action definition table in FIG. 2 stored in the action definition accumulation unit in FIG. 1.

FIG. 20 is a diagram, as an example, a record including a car navigation app or a gourmet app in the "app type" field in the action definition table in FIG. 2 stored in the action definition accumulation unit in FIG. 1.

FIG. 27 is a diagram illustrating, as an example, a record including a video app or a weather forecast app in the "app type" field in the action definition table in FIG. 2 stored in the action definition accumulation unit in FIG. 1.

FIG. 32 is a diagram illustrating, as an example, a record including a video app in the "app type" field in the action definition table in FIG. 2 stored in the action definition accumulation unit 52 in FIG. 1.

FIG. 35 is a diagram illustrating, as an example, a record including a map app in the "app type" field in the action definition table in FIG. 2 stored in the action definition accumulation unit in FIG. 1.

FIG. 39 is a diagram illustrating, as an example, a record including a discussion app in the "app type" field in the action definition table in FIG. 2 stored in the action definition accumulation unit in FIG. 1.

DESCRIPTION OF EMBODIMENTS

Hereinafter, embodiments of the present technology will be described with reference to the drawings.

<<One Embodiment of Information Processing Device to Which Present Technology Is Applied>>

Figures 1, 2:
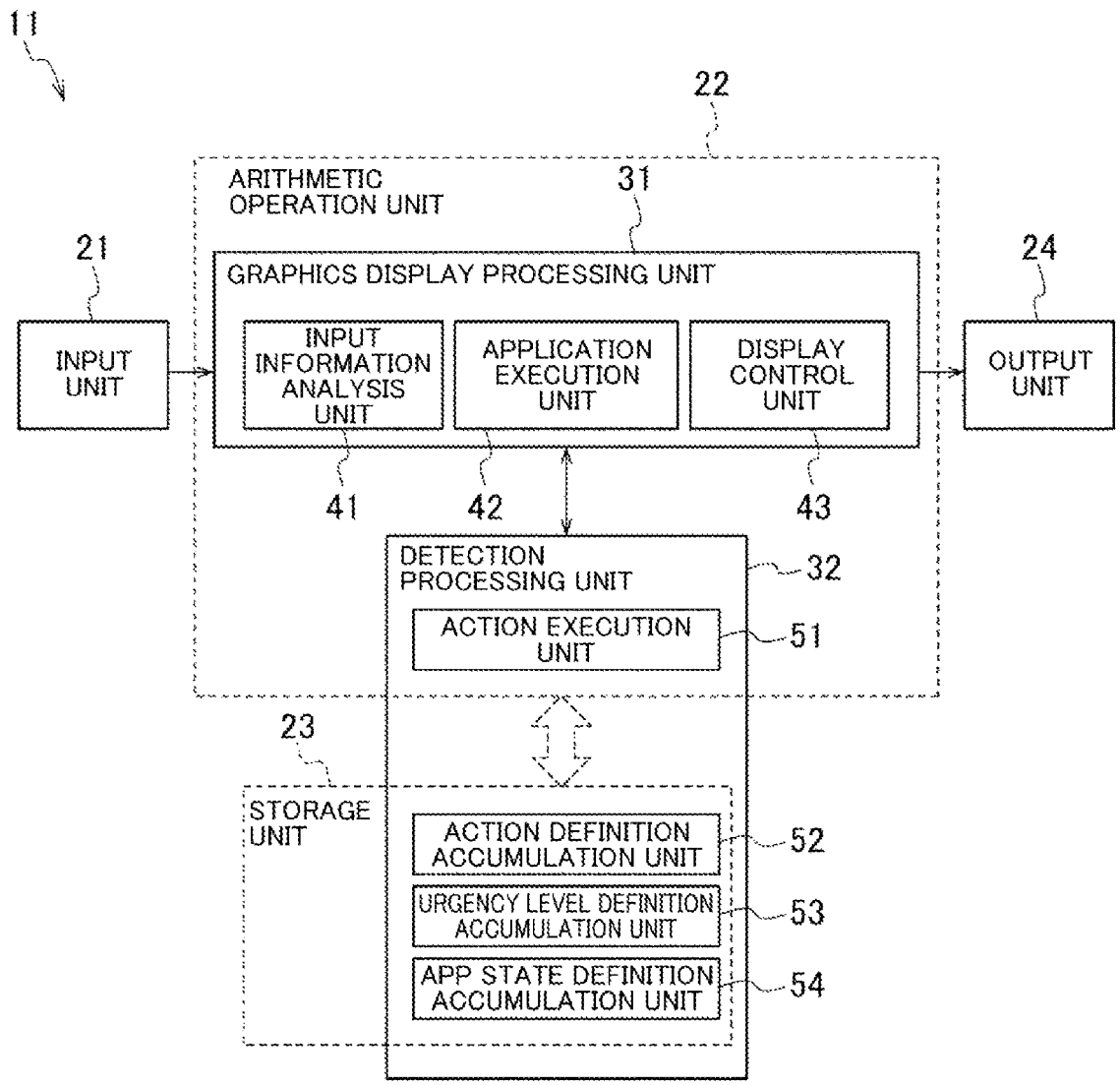
FIG. 1 is a block diagram illustrating a configuration example of an embodiment of an information processing system to which the present technology is applied.
FIG. 2 is a diagram illustrating, as an example, an action definition table.

FIG. 1 is a block diagram illustrating a configuration example of an embodiment of an information processing device to which the present technology is applied.

In FIG. 1, an information processing device 11 is a device that causes a projector to project presentation information generated by predetermined processing at a movable presentation location inside a vehicle or inside a room such as a conference room, for example, to present the presentation information to a user.

The presentation information is information generated by processing of an operating system (OS) or a predetermined application (hereinafter, simply referred to as an app). Types of the app (processing) are not limited to specific types and may be a weather forecast app, a music app, a car navigation app, a gourmet app, a video app, a map app, a discussion app, or the like.

A presentation location being movable means that a presentation location where presentation information is presented (projected) is a surface of a moving member. For example, a door glass or a sunroof (slide panel) of a vehicle, a table (top plate) that can move and is provided in a conference room, or the like can be the movable presentation location. Note that there may be a plurality of presentation locations where presentation information is projected and some of the presentation locations may be surfaces of fixed members (immovable presentation locations).

The information processing device 11 includes an input unit 21, an arithmetic operation unit 22, a storage unit 23, and an output unit 24.

The input unit 21 acquires "information regarding a presentation location" where presentation information is projected, "information regarding a user", and "information regarding an environment" of the presentation location and supplies the information as input information to the arithmetic operation unit 22.

As specific components of the input unit 21, appropriate sensors or the like are appropriately selected and used in accordance with an environment where the presentation location is provided or the like.

For example, the sensors that acquire the "information regarding the presentation location" and the "information regarding the user" may be one or more image sensors, depth sensors, and the like that acquire images of the presentation location and the user. The image sensors may be visible light cameras or may be infrared cameras. The depth sensors may be stereo cameras, time-of-flight (ToF) sensors, or the like that acquire three-dimensional information of the presentation location and the user.

Also, the sensors and the like that acquire the "information regarding the presentation location" may be position sensors that detect positions of members including the presentation location.

Note that in a case in which the members including the presentation location are referred to, the members represent not only members that are integral with the member that serves as the presentation location but also members that work in conjunction with the member that serves as the presentation location, that is, members related to a change in state of the presentation location.

Also, in a case in which an operation portion (a case in which the operation unit is an operation portion of a remote controller is included; the same applies below) such as a touch sensor or an operation switch for moving the members including the presentation location using electric power or the like is included, or in a case in which an operation portion for providing a predetermined instruction to processing of an app or the like in the arithmetic operation unit 22 is included, the information indicating motions of the user who operates the operation unit corresponds to the "information regarding the user". In a case in which such an operation portion is included, (a mechanism for detecting a state of) the operation unit may be included as a sensor or the like that acquires the "information regarding the user".

The sensor or the like that acquires the "information regarding the environment" may be an accelerator sensor, an angular speed sensor, a global positioning system (GPS), or the like. In a case in which an environment where the member that serves as the presentation location is provided is a vehicle, for example, the sensor or the like that acquires the "information regarding the environment" may be an acceleration sensor, the GPS, or the like for detecting whether the vehicle is traveling, stopped or the like.

Note that information obtained from a device other than the information processing device 11 may be supplied as input information from the input unit 21 to the arithmetic operation unit 22.

The arithmetic operation unit 22 acquires necessary information (which will be described later) on the basis of the input information or the like from the input unit 21.

Also, the arithmetic operation unit 22 executes an OS program, executes one or more apps designated by the user, and supplies presentation information generated by the OS and the apps to the output unit 24.

The storage unit 23 stores data and the like necessary to execute programs of the OS, various apps, and the like executed by the arithmetic operation unit 22.

The output unit 24 includes one or more projectors that are caused to project presentation information supplied from the arithmetic operation unit 22 to the presentation location. The projectors may be fixed projectors with fixed projection directions or may be movable projectors with variable projection directions.

Here, the arithmetic operation unit 22 supplies, to the projectors, the presentation information as an image in a region of a window corresponding to the position and the size of the presentation location in a region (full projection region) of a maximum projection image that can be projected by the projectors.

Also, the arithmetic operation unit 22 supplies an image of the presentation information after correction of projection distortion to the projectors on the basis of an inclination or the like of the presentation location (projection surface) with respect to the projectors.

Note that it is possible to cause one projector to project an image of the presentation information to presentation locations at a plurality of positions and to change the positions of the presentation locations, by the arithmetic operation unit 22 controlling (changing) the position and the size of the window in the full projection region.

Also, it is possible to cause one projector to project an image of the same presentation information or images of a plurality of different pieces of presentation information on a plurality of presentation locations at the same time, by the arithmetic operation unit 22 setting a plurality of windows in the full projection region.

Also, in a case of a movable projector, the arithmetic operation unit 22 may cause the one projector to project images of the presentation information at presentation locations at a plurality of positions, by controlling projection directions of the projector.

In addition, the output unit 24 includes, as a component, a speaker that outputs music and sound as needed. The arithmetic operation unit 22 supplies sound information such as music, sound, and the like generated through processing of an app or the like to the speaker of the output unit 24.

(Details of Processing Performed by Arithmetic Operation Unit 22)

Next, details of processing performed by the arithmetic operation unit 22 will be described. The arithmetic operation unit 22 includes, as functional blocks, a graphics display processing unit 31 and a detection processing unit 32 that are constructed through execution of a program. Note that the detection processing unit 32 includes a database stored in the storage unit 23.

The graphics display processing unit 31 includes an input information analysis unit 41, an application execution unit 42, and a display control unit 43.

The input information analysis unit 41 analyzes information input from the input unit 21 and acquires "presentation location information" regarding a change in state of the presentation location, "user information" regarding a response of a user to processing of an app or the like, and "environment information" indicating a state of an environment of the presentation location.

The "presentation location information" is "information indicating a change in state of the presentation location" or "information indicating a motion of the user related to the change in state of the presentation location" in a case in which the movable presentation location where the presentation information is projected has moved.

The "information indicating a change in state of the presentation location" is acquired by the input information analysis unit 41 analyzing the "information regarding the presentation location" that is information input from the input unit 21.

The "information indicating a motion of the user related to the change in state of the presentation location" is information indicating a motion of the user who performs an operation on an operation portion for moving the member including the presentation location using electric power or information indicating a motion of the user manually moving the member including the presentation location.

The "information indicating a motion of the user related to the change in state of the presentation location" is acquired by the input information analysis unit 41 analyzing the "information regarding the user" that is information input from the input unit 21.

The "user information" includes information indicating a state of the user in response to the presentation information (whether or not the user is viewing the presentation information).

Also, the "user information" includes the "information indicating an operation of the user on the processing".

The "information indicating an operation of the user" further includes information indicating content of an operation of the user on the processing and information indicating whether or not the user performs an operation on the processing (whether or not the user is performing the operation).

The "user information" is acquired by the input information analysis unit 41 analyzing the "information regarding the user" that is information input from the input unit 21.

In a case in which an environment where the presentation location is provided is inside a vehicle, for example, the "environment information" is information indicating that the vehicle is in a traveling state or a stopped state.

The "environment information" is acquired by the input information analysis unit 41 analyzing the "information regarding the environment" that is information input from the input unit 21.

The input information analysis unit 41 supplies, to the detection processing unit 32, the "presentation location information", the "user information", and the "environment information" acquired by analyzing the input information. Note that the "user information" supplied to the detection processing unit 32 is specifically "information indicating a state of the user (whether or not the user is viewing the presentation information)" and "information indicating whether the user performs an operation on the processing (whether or not the user is performing the operation)".

Also, the input information analysis unit 41 supplies the "information indicating content of the operation of the user on the processing" as the "user information" to the application execution unit 42.

The application execution unit 42 activates an app designated by the user and supplies presentation information generated by the app to the display control unit 43 on the basis of the "information indicating content of the operation of the user on the processing" from the input information analysis unit 41.

Also, the application execution unit 42 supplies "information indicating the type of the processing (app)" that the application execution unit 42 itself is executing and "information indicating a state (content) of the processing" to the detection processing unit 32.

Note that the "information indicating the type of the processing (app)" and the "information indicating the state (content) of the processing" are "processing information" related to the processing (app) for generating presentation information.

In addition, the application execution unit 42 executes processing corresponding to the content of the operation of the user on the basis of the "user information" ("information indicating content of the operation of the user on the processing") from the input information analysis unit 41 during execution of the app.

Moreover, the application execution unit 42 executes processing (which will be described later) indicated by the detection processing unit 32.

The display control unit 43 performs control of a presentation state related to a presentation location (region), presentation form, and the like when the presentation information from the application execution unit 42 is projected on the presentation location.

In other words, the display control unit 43 supplies, to the projector of the output unit 24, an image of the presentation information as a projection image in a region of a window corresponding to the position and the size of the presentation location designated by the user on the basis of the "information indicating the content of the operation of the user on the processing" from the input information analysis unit 41.

Also, the display control unit 43 controls the presentation form (an image configuration and the like) of the presentation information when the presentation information from the application execution unit 42 is projected on the presentation location.

Moreover, the display control unit 43 performs control of the presentation location where the presentation information is projected and control of the presentation form of the presentation information in accordance with the instruction from the detection processing unit 32.

The detection processing unit 32 includes an action execution unit 51, an action definition accumulation unit 52, an urgency level definition accumulation unit 53, and an app state definition accumulation unit 54.

The action execution unit 51 acquires the "presentation location information", the "processing information", the "user information", and the "environment information" from the input information analysis unit 41 and the application execution unit 42 of the graphics display processing unit 31.

The "user information" acquired by the action execution unit 51 from the input information analysis unit 41 is specifically the "information indicating the state of the user in response to the presentation information (whether or not the user is viewing the presentation information)" and the "information indicating whether the user performs an operation on the processing (whether or not the user is performing the operation)".

Also, the action execution unit 51 detects an action to be executed from the database stored in the storage unit 23 on the basis of the acquired information.

Moreover, the action execution unit 51 provides an instruction for executing processing of the action detected from the database to the graphics display processing unit 31 (the application execution unit 42 and the display control unit 43).

The action definition accumulation unit 52 accumulates data (records) of an action definition table that is a database for detecting an action to be executed by the action execution unit 51 (to cause the graphics display processing unit 31 to execute it).

FIG. 2 is a diagram illustrating, as an example, the action definition table. The action definition table includes an "app type", an "app state", a "trigger", "urgency level", and an "action" as items (attributes) of each column (column). Each record (row) in the action definition table includes fields to store data corresponding to the items of the columns.

In other words, each record has fields for storing content of the "app type", the "app state", the "trigger", the "urgency level", and the "action".

Hereinafter, the fields storing data of the "app type", the "app state", the "trigger", the "urgency level", and the "action" of each record will be referred to as an "app type" field, an "app state" field, a "trigger" field, an "urgency level" field, and an "action" field.

The "app type" field represents types of apps that the graphics display processing unit 31 (application execution unit 42) can execute. In the "app type" field, data indicating types of apps such as a weather forecast app, a music app, a car navigation app, a video app, a map app, and a discussion app, for example, is stored.

The action execution unit 51 detects a record including the type of the app that the graphics display processing unit 31 is executing as data in the "app type" field on the basis of the "processing information" from the graphics display processing unit 31.

More specifically, the action execution unit 51 detects a record including the type of the app obtained from the "information indicating the type of the processing (app)" supplied from the application execution unit 42 as data in the "app type"

FIELD

The "app state" field represents at least one state out of a state of the processing of the app, a state related to a response of the user to the processing of the app, and a state of an environment of the presentation location.

The state of the processing of the app represents a state of the processing in which content is being replayed, stopped, or the like, in a case of a music app or a video app, for example.

Also, the state related to a response of the user to the processing represents a state of the user in response to the presentation information (projection image) (whether or not the user is viewing the presentation information) or whether the user performs an operation on the processing (whether or not the user is performing the operation).

The state of the environment of the presentation location represents a state of the environment, such as whether or not a vehicle is traveling, in a case in which a member provided inside the vehicle is a presentation location, for example.

In the "app state" field, any app state out of the app states defined in the app state definition table in FIG. 3, which will be described later, is stored.

The action execution unit 51 detects, from among records in the action definition table, a record in which data in the "app state" field corresponds to the state of the processing, the state related to the response of the user to the processing, and the state of the environment of the presentation location obtained from the "processing information" the "user information", and the "environment information" from the graphics display processing unit 31 (application execution unit 42).

The "trigger" field represents an event that triggers execution of an action and a change in state of the presentation location or a motion of the user related to the change in state of the presentation location.

The change in state of the presentation location represents, for example, a change in state such as sliding (position change) of an armrest of a vehicle as a movable presentation location.

The motion of the user related to the change in state of the presentation location of the presentation information represents, for example, a motion of the user placing his/her hand on an armrest of a vehicle as a movable presentation location to slide it.

The action execution unit 51 detects a record including a change in state of the presentation location or a motion of the user related to the change in state of the presentation location as data in the "trigger" field on the basis of the "presentation location information" from the graphics display processing unit 31 (input information analysis unit 41).

Note that the change in state of the presentation location or the motion of the user represented by the data in the "trigger" field will be simply referred to as a trigger.

The "urgency level" field represents a degree to which a state after a change is related to physiology when no response is made in a case in which the state of the presentation location is changed due to the trigger represented by the data in the "trigger" field.

The "action" field represents processing that the detection processing unit 32 executes (the detection processing unit 32 causes the graphics display processing unit 31 to execute) in a case in which the trigger represented by the data in the "trigger" field occurs.

The "action" field represents, for example, content of at least one kind of control out of control of the presentation location such as movement or change of the presentation location (projection region), control of a presentation form of the presentation information such as a configuration (layout) of a projection image of the presentation information or addition of alert information, and control of a state of the processing of the app. Note that content of the control also includes a case in which nothing is to be done, and in a case in which all pieces of content of the control indicates that nothing is to be done, content indicating that nothing is to be done is stored in the "action" field.

As described above, each record in the action definition table defines an action execution condition that the action in the "action" field is to be executed if the trigger in the "trigger" field occurs when the graphics display processing unit 31 is executing the app in the "app type" field and the app state in the "app state" field has been achieved.

Also, an app represented by data in the "app type" field of any one of the records in the action definition table will be referred to as an app (with a defined action) defined in the action definition accumulation unit 52, and a trigger represented by data in the "trigger" field of any one of the records in the action definition table will be referred to as a trigger (with a defined action) defined in the action definition accumulation unit 52.

In FIG. 1, the app state definition accumulation unit 54 accumulates data in an app state definition table for defining types of data in the in the "app state" field in the action definition table in FIG. 2.

FIG. 3 is a diagram illustrating, as an example, the app state definition table. The app state definition table includes an "app state" and a "meaning" as items (attributes) of a column (column). Each record (row) of the app state definition table includes fields for storing data corresponding to the items of each column.

In other words, each record in the app state definition table includes an "app state field" and a "meaning" field for storing content of the "app state" and the "meaning".

In the "app state" field, four types of app states, such as "currently operated", "currently viewed", "currently replayed", and "ordinary", for example are stored. Meanings of "currently operated", "currently viewed", "currently replayed", and "ordinary" are stored in the "meaning" field. According to the app state definition table in FIG. 3, "currently operated", "currently viewed", "currently replayed", and "ordinary" in the "app state" field represent the following meanings.

"Currently operated" represents a state in which a user operation on the app is being performed.

"Currently viewed" represents a state in which the user is viewing the presentation information (projection image) of the app.

"Currently replayed" represents a state in which app is replaying content.

"Ordinary" represents a state that does not correspond to other types of app states.

Note that it is not necessary that the "meaning" field and data in the app state definition table be stored as table data.

Also, although only the four types of app states have been described as examples in the app state definition table in FIG. 3, more types of app states may be defined. App states obtained by further subdividing "currently operated", "currently viewed", "currently replayed", and "ordinary" are shown with brackets in the "app state" fields in the action state table in FIGS. 15, 20, and 39 illustrated as an example below.

In FIG. 1, the urgency level definition accumulation unit 53 accumulates (saves) an urgency level definition table for defining "urgency levels" of the app state definition table in FIG. 2.

FIG. 4 is a diagram illustrating, as an example, the urgency level definition table. The urgency level definition table includes an "urgency level" and a "meaning" as items (attributes) of the fields (columns). Each record (row) in the urgency level definition table stores data corresponding to the items of the fields.

Four types of data, namely "critical", "major", "minor", and "trivial" are shown as examples in the "urgency level" field. Meanings of "critical", "major", "minor", and "trivial" are stored in the fields of "meaning". According to the app state definition table in FIG. 4, "critical", "major", "minor", and "trivial" in the "urgency level" field have the following meanings.

"Critical" represents a state in which if the action represented by the data in the "action" field in FIG. 2 is not immediately executed, the non-execution leads to physiology.

"Major" represents that there is a probability that continuation of the same state for a long period of time may lead to physiology.

"Minor" represents a state which may lead to inconvenience of the user.

"Trivial" represents a state in which no action is required to be executed.

Here, the data in the "urgency level" field is not referred to when the action execution unit 51 detects an action to be executed using the action definition table in FIG. 2, and it is thus possible not to provide the columns (columns) for the "urgency level" in the action definition table in FIG. 2 and not to perform definition of the urgency level based on the urgency level definition table in FIG. 4 as well.

However, in a case in which data in the "app state" field, the "trigger" field, and the "urgency level" field is common to records of different types of apps in the "app type" field in the action definition table in FIG. 2, for example, it is possible to set common data in the "action" field.

Thus, it is possible to automatically determine data in the "action" field by selecting and setting the urgency level in the "urgency level" field in a case in which the trigger in the "trigger" field has occurred in the app state in the "app state" field when a new app is added to the action definition table, for example, from among the urgency levels defined in the urgency level definition table.

The data in the "action" field automatically determined may be data in the "action" field of another app with common data in the "app state" field, the "trigger" field, and the "urgency level" field or may be data in the "action" field determined in advance for a combination of data in the "app state" field, the "trigger" field, and the "urgency level" field. In this manner, it is possible to reduce time and efforts to review actions in the "action" field for each app and create an action definition table and to easily add a new app to the apps in the action definition table.

Note that it is not necessary that the "meaning" field and data in the urgency level definition table in FIG. 4 be stored as table data.

Figure 5:
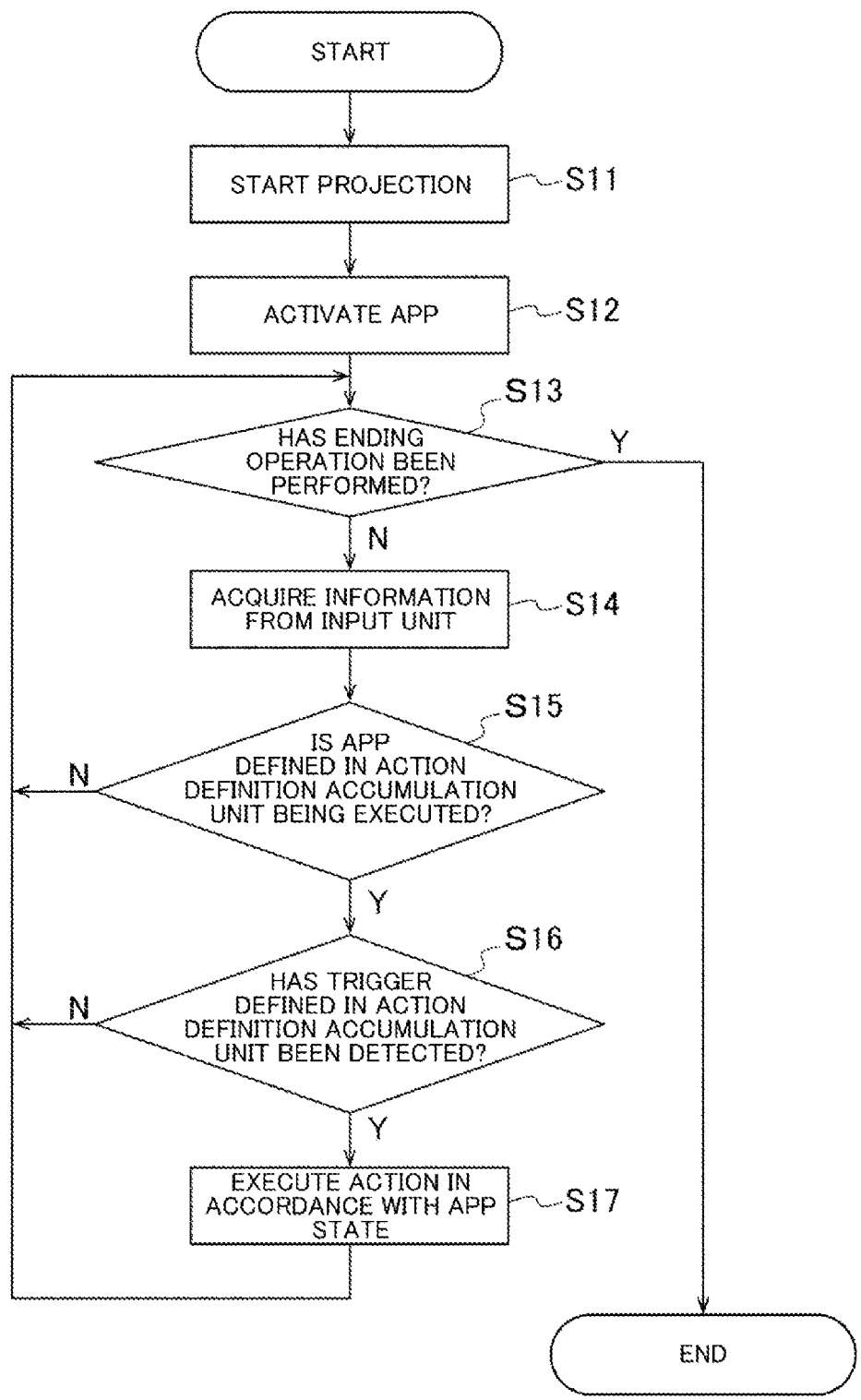
FIG. 5 is a flowchart for explaining an example of processing performed by an information processing device.

FIG. 5 is a flowchart for explaining an example of processing performed by the information processing device 11.

In Step S11, the graphics display processing unit 31 supplies presentation information to the output unit 24 and starts projection of the presentation information. The processing proceeds from Step S11 to Step S12.

Here, the graphics display processing unit 31 starts projection of a projection image in a case in which the graphics display processing unit 31 detects that the user has performed a switch operation, a gesture, or the like for providing an instruction for projecting the projection image to a predetermined presentation location on the basis of information input from the input unit 21. Also, the graphics display processing unit 31 causes a guide image for the user to select an app to be activated, for example, to be projected as an initial projection image to the presentation location when the projection is started.

In Step S12, the graphics display processing unit 31 activates the app selected by the user on the basis of the user's operation ("information indicating content of the operation of the user") acquired from the information ("information regarding the user") input from the input unit 21.

Then, the graphics display processing unit 31 supplies presentation information generated by the activated app to the projector of the output unit 24 and causes the presentation information to be projected on the presentation location. The processing proceeds from Step S12 to Step S13.

In Step S13, the graphics display processing unit 31 determines whether or not the user has performed an operation for ending the projection of the projection information on the basis of the operation of the user.

In a case in which it is determined that the ending operation has been performed in Step S13, the processing of this flowchart ends.

In a case in which it is determined that the ending operation has not been performed in Step S13, the processing proceeds from Step S13 to Step S14.

In Step S14, the graphics display processing unit 31 acquires input information using the input unit 21. Then, the graphics display processing unit 31 analyzes the acquired input information and acquires "presentation location information", "user information", and "environment information".

The graphics display processing unit 31 supplies, to the detection processing unit 32, the "presentation location information", the "user information", and the "environment information" acquired through the analysis of the input information, information indicating the type of the processing (app) that the graphics display processing unit 31 is executing, and information indicating a state of the processing that the graphics display processing unit 31 is executing, as "processing information".

In other words, the graphics display processing unit 31 supplies the "presentation location information", the "processing information", the "user information", and the "environment information" to the detection processing unit 32. The processing proceeds from Step S14 to Step S15.

In Step S15, the detection processing unit 32 determines whether or not the graphics display processing unit 31 is executing any of the apps defined in the action definition accumulation unit 52.

In other words, the detection processing unit 32 determines whether or not the app that the graphics display processing unit 31 is executing is present as data in the "app type" field of any of the records in the action definition table in FIG. 2 on the basis of the "processing information" supplied from the graphics display processing unit 31 in Step S14.

In a case in which it is determined that the graphics display processing unit 31 is not executing any app defined in the action definition accumulation unit 52 in Step S15, the processing returns from Steps S15 to S13 to repeat Steps S13 to S15.

On the other hand, in a case in which it is determined that the graphics display processing unit 31 is executing any of the apps defined in the action definition accumulation unit 52 in Step S15, the processing proceeds from Step S15 to Step S16.

In Step S16, the detection processing unit 32 determines whether or not any of the triggers defined in the action definition accumulation unit 52 has been detected.

In other words, the detection processing unit 32 acquires a change in state of the presentation location or a motion of the user related to the change in state of the presentation location on the basis of the "presentation location information" acquired in Step S14. Then, the detection processing unit 32 determines whether or not the change in state of the presentation location or the motion of the user acquired is present as a trigger represented by data in the "trigger" field in any of the records for the app that the graphics display processing unit 31 is executing in the action definition table in FIG. 2.

In a case in which it is determined that any of the triggers defined in the action definition accumulation unit 52 has not occurred in Step S16, the processing returns from Step S16 to Step S13 to repeat the processing in Steps S13 to S16.

On the other hand, in a case in which it is determined that any of the triggers defined in the action definition accumulation unit 52 has been detected in Step S16, the processing proceeds from Step S16 to Step S17.

In Step S17, the detection processing unit 32 detects a record including the app state obtained from the "processing information", the "user information", and the "environment information" acquired in Step S14 as data in the "app state" field from among the records in the action definition table in FIG. 2 for the app that the graphics display processing unit 31 is executing and the trigger detected in Step S16.

Then, the detection processing unit 32 causes the graphics display processing unit 31 to execute an action in the "action" field of the detected record as an action in accordance with the app state. The processing returns from Step S17 to Step S13 to repeat Steps S13 to S17.

In a case in which the graphics display processing unit 31 determines that the ending operation has been performed in Step S13, the processing of this flowchart ends.

<<Application Example 1 of Information Processing Device 11>>

As Application Example 1 of the information processing device 11 in FIG. 11, a case in which the information processing device 11 is applied as a projection device that projects presentation information of various apps to a movable presentation location inside a vehicle will be described.

Figure 6:
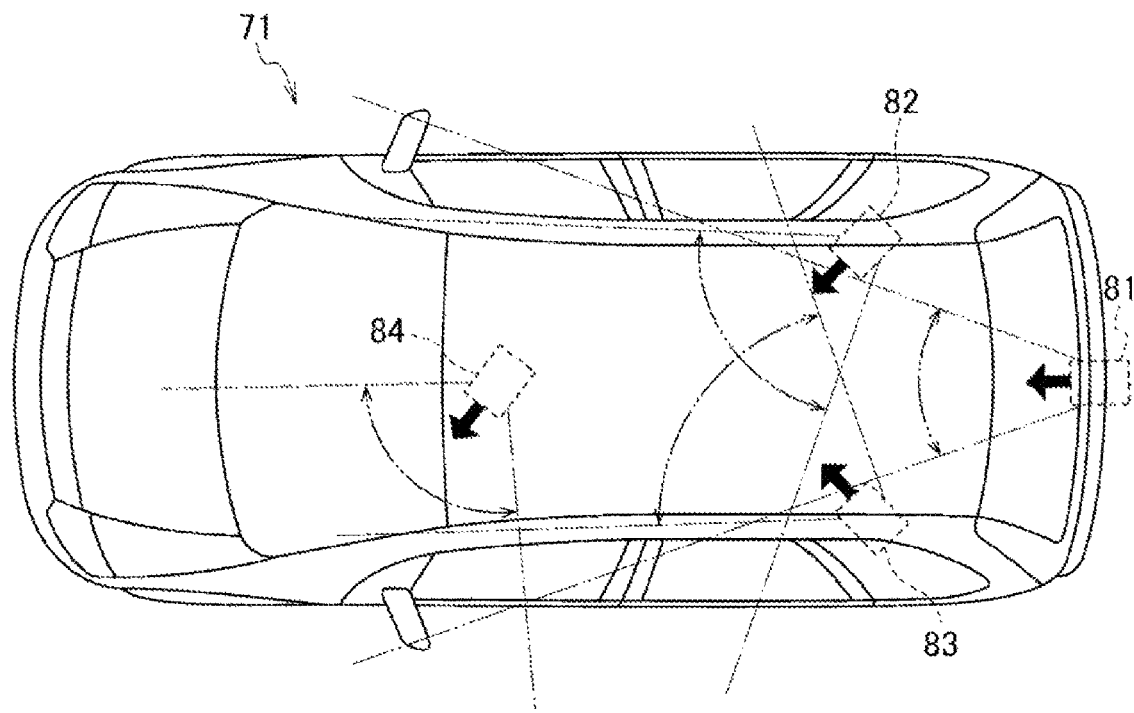
FIG. 6 is a plan view of a vehicle in which the information processing device is applied as an in-vehicle projection device.
Figure 7:
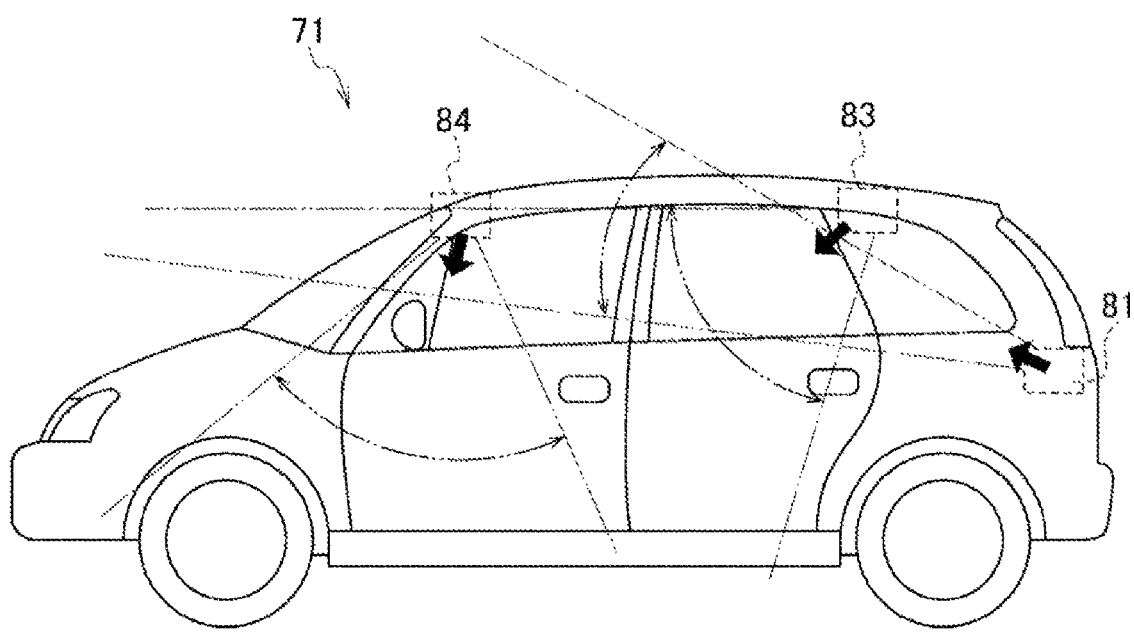
FIG. 7 is a side view of the vehicle in which the information processing device is applied as the in-vehicle projection device.

FIGS. 6 and 7 are a plan view and a side view of a vehicle 71 in which the information processing device 11 is applied as a projection device inside the vehicle.

In FIGS. 6 and 7, projectors 81, 82, 83, and 84 that are the output units 24 in the information processing device 11 in FIG. 1 are mounted inside the vehicle 71.

The projector 81 is mounted near a center of a rear portion inside the vehicle in the up-down and left-right directions. The projector 82 is mounted at an upper portion of a side surface of the rear portion inside the vehicle on the right side. The projector 83 is mounted at an upper portion of a side surface of the rear portion inside the vehicle on the left side. The projector 84 is mounted at a front-side part of a ceiling inside the vehicle.

Figure 8:
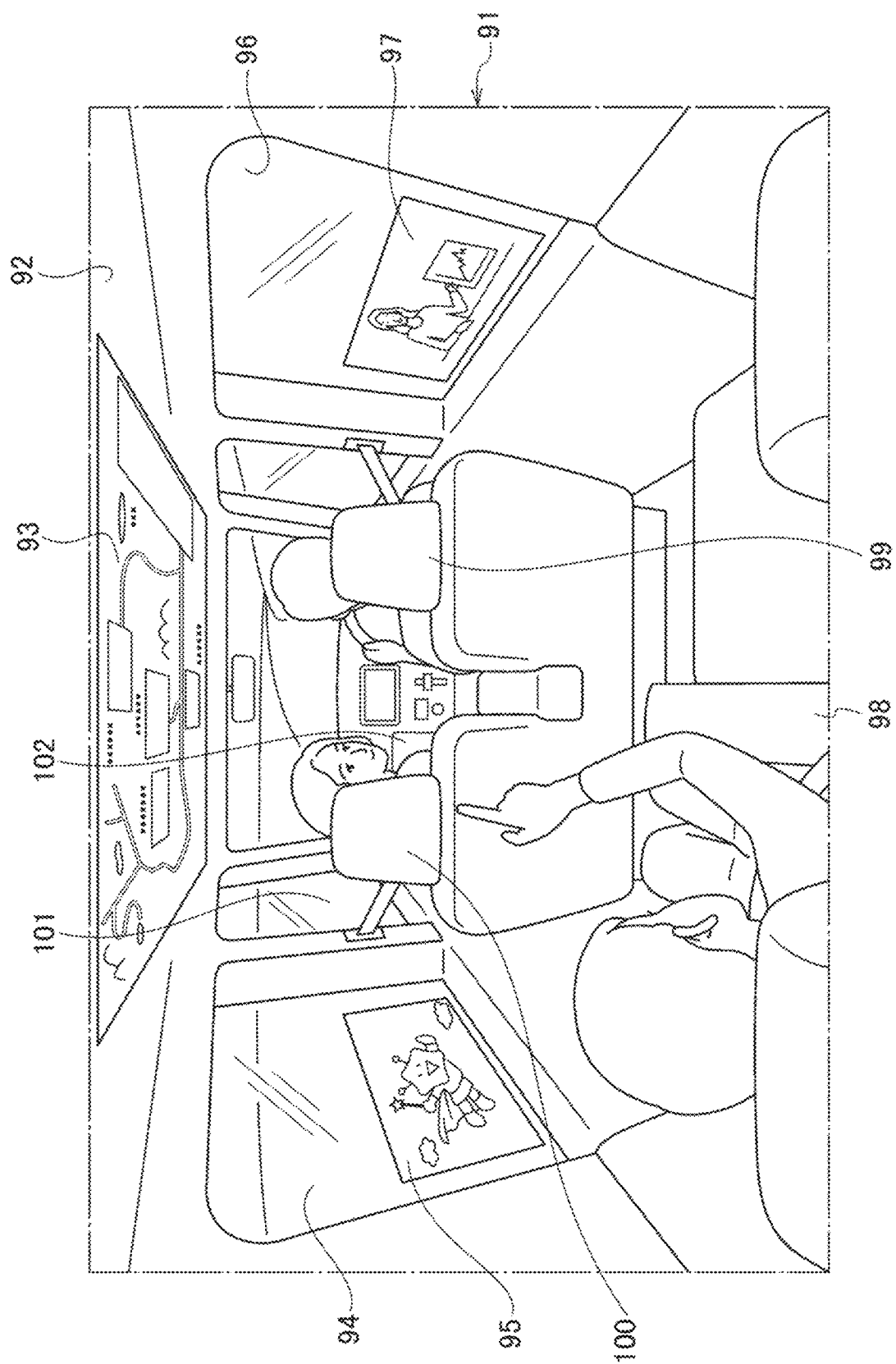
FIG. 8 is a diagram illustrating, as an example, a position of a presentation location where presentation information is projected in the interior of the vehicle.

FIG. 8 is a diagram illustrating, as an example, a position of a presentation location (projection surface) where presentation information is projected in an interior 91 of the vehicle 71.

In the interior 91 of the vehicle 71, a ceiling 92 is used as the presentation location, and a projection image 93 from the projector 81 is projected on the ceiling 92. Note that in a case in which the vehicle 71 is provided with a sunroof, a slide panel blocking the sunroof (hereinafter, simply referred to as a sunroof) is used as a movable presentation location.

Also, a left door glass 94 of a rear seat is used as a movable presentation location, and a projection image 95 from the projector 82 is projected on the left door glass 94.

In addition, a right door glass 96 of the rear seat is used as a movable presentation location, and a projection image 97 from the projector 83 is projected on the right door glass 96.

An armrest 98 at the center of the rear seat, a headrest 99 of a driver seat, a headrest 100 of a front passenger seat, a door glass 101 of the front passenger seat, a dashboard (a door of a glove box of the front passenger seat) 102, and the like are used as movable presentation locations as well as the ceiling 92 and the left door glass 94 and the right door glass 96 of the rear seat. For example, a projection image from any of the projectors 81 to 84 is projected on the armrest 98.

Projection images from any of the projectors 81 to 83 are projected on the headrest 99 of the driver seat and the headrest 100 of the front passenger seat.

A projection image from the projector 84 is projected on the door glass 101 and the dashboard 102 of the front passenger seat.

<In Case in which Slidable Armrest 98 of Rear Seat is Used as Movable Presentation Location> (in Case in which Presentation Information of Weather Forecast App is Projected)

Figure 9:
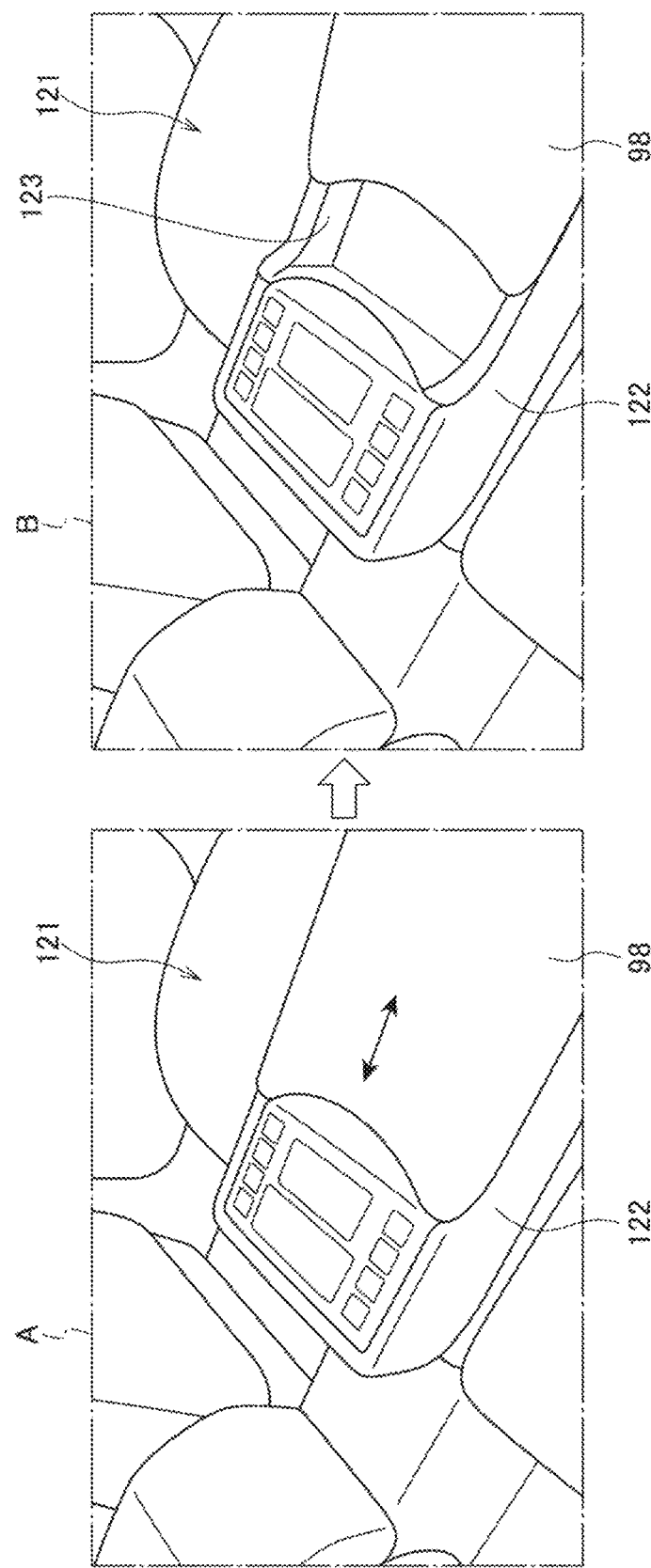
FIG. 9 is a diagram illustrating, as an example, operations of a slidable armrest of a rear seat.

FIG. 9 is a diagram illustrating, as an example, of operations of the slidable armrest 98 of the rear seat.

In the state A and the state B in FIG. 9, the armrest 98 is provided such that an upper portion of a rectangular base 122 mounted at the center of the rear seat 121 is slidable in the front-back direction. In the state A, the armrest 98 is disposed at a standard position at a front end of a movable range relative to the base 122. In the state B, the armrest 98 is slid to the rear side of the movable range relative to the base 122, and an housing portion 123 of the base 122 opens.

Figure 10:
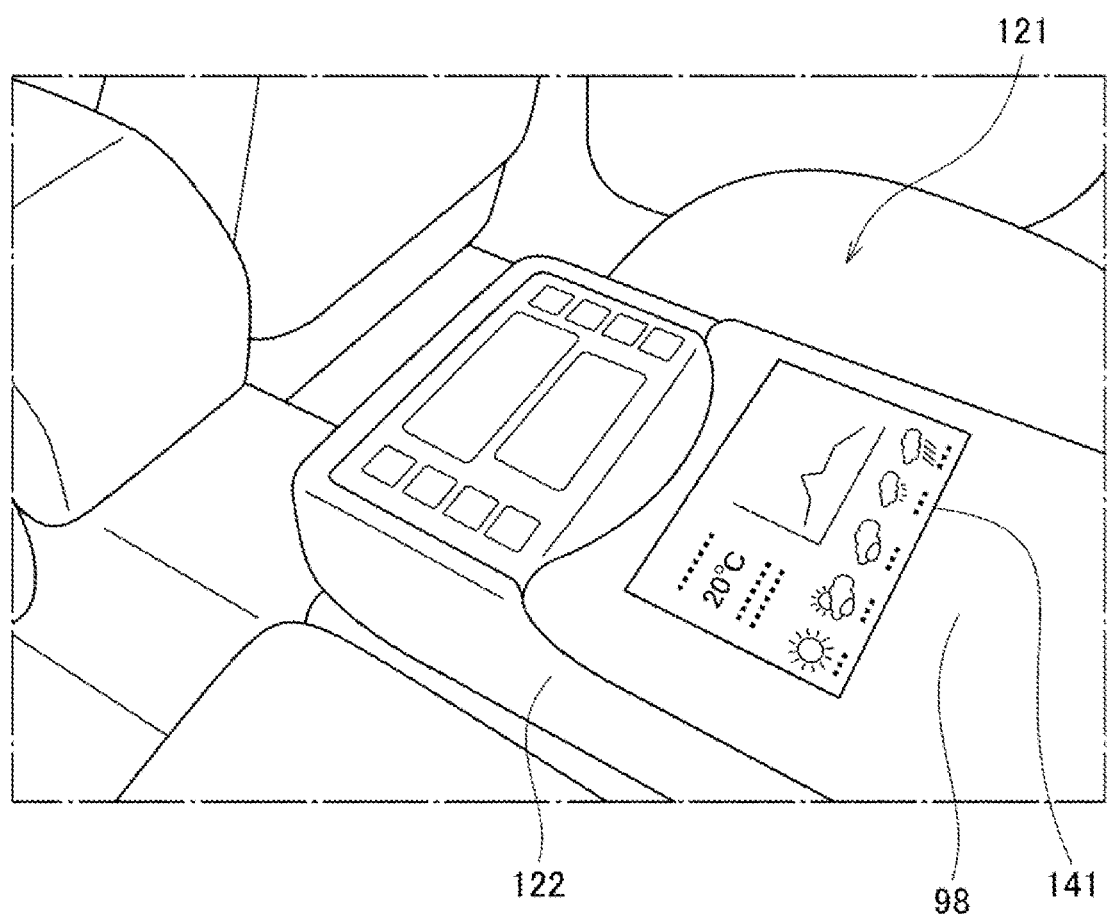
FIG. 10 is a diagram illustrating, as an example, a state in which presentation information of a weather forecast app is projected on the armrest.

FIG. 10 is a diagram illustrating, as an example, a state in which presentation information of a weather forecast app is projected on the armrest 98.

If the user performs an operation of causing presentation information of the weather forecast app to be projected using the armrest 98 as the presentation location, then a projection image 141 of the presentation information of the weather forecast app is projected on the armrest 98 by the projector 82 in FIG. 6, for example. The projection image 141 is projected on an upper surface of the armrest 98 on the front end side, for example.

Also, if the user slides the armrest 98 backward, then a trigger occurs.

FIG. 11 is a diagram illustrating, as an example, a record including a weather forecast app in the "app type" field in the action definition table in FIG. 2 stored in the action definition accumulation unit 52 in FIG. 1.

When the user slides (shifts) the armrest 98 backward as in the state B in FIG. 9 during an operation on the weather forecast app, the app type is a weather forecast app, the app state is "currently operated", and the trigger is a user's motion of shifting the armrest 98 or a change in position of the armrest 98.

In this case, the situation corresponds to the record R11 in FIG. 11, the detection processing unit 32 in FIG. 1 causes the graphics display processing unit 31 in FIG. 1 to execute the action in the "action" field of the record R11 in FIG. 11.

Figure 12:
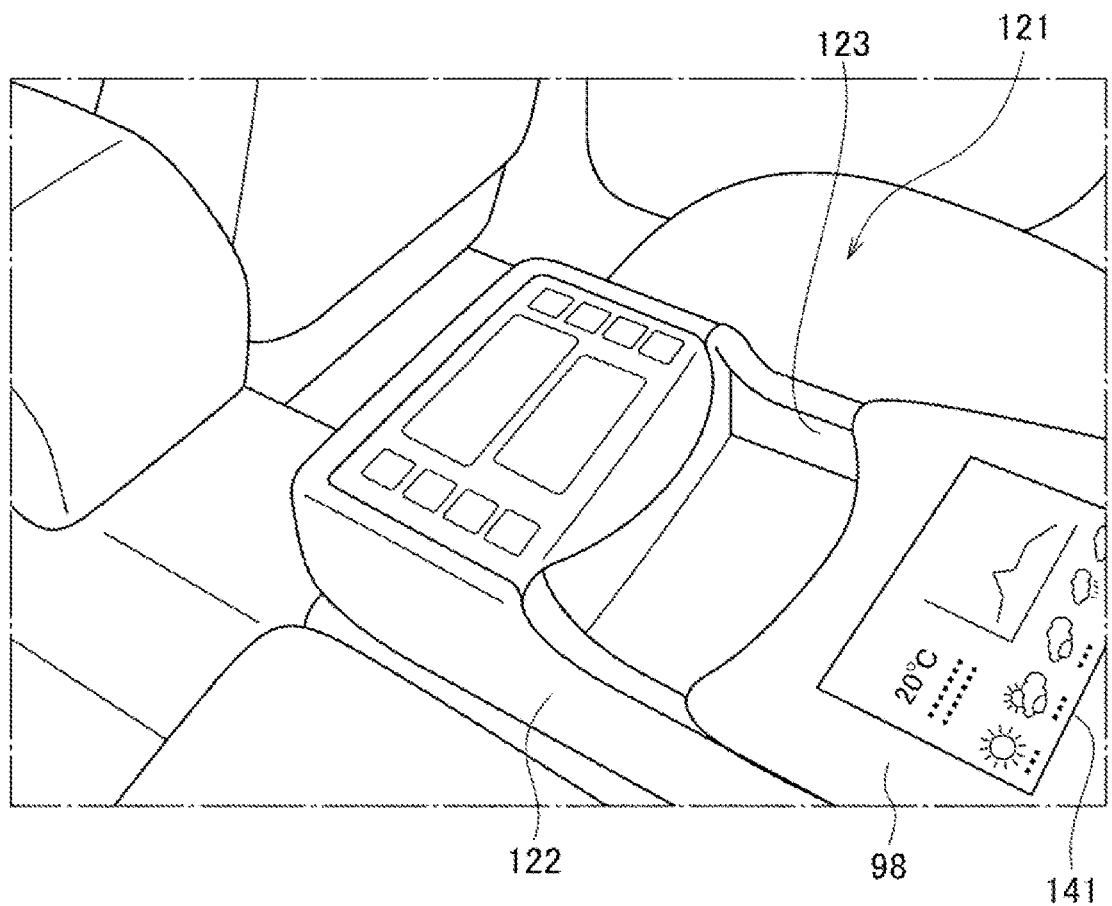
FIG. 12 is a diagram illustrating states of the armrest and a projection image when an action of a record R11 in FIG. 11 is executed.

FIG. 12 is a diagram illustrating, as an example, states of the armrest 98 and a projection image when the action of the record R11 in FIG. 11 is executed.

In a case in which the action of the record R11 is executed, as illustrated in FIG. 12, the projection image 141 that is the presentation information of the weather forecast app is slid backward together with the armrest 98.

In other words, a region of a window (hereinafter, referred to as an app window) where the presentation information of the weather forecast app is projected is slid backward together with the armrest 98, and the projection image 141 of the presentation information is slid backward together with the armrest 98. In this manner, the entire presentation information of the weather forecast app is projected on the front end side of the surface of the armrest 98 without missing.

When the armrest 98 is slid in a case in which the user is performing an operation on the weather forecast app, it is considered that the user will continue to use the weather forecast app. Usability is maintained by the app window being slid along with sliding of the armrest 98 as in FIG. 12 and by the entire presentation information of the weather forecast app being projected as the projection image 141.

Next, when the armrest 98 is slid (shifted) backward as in the state B in FIG. 9 in a case in which the user is viewing the projection image 141 that is presentation information of the weather forecast app instead of performing an operation on the weather forecast app, the app type is a weather forecast app, the app state is "currently viewed", and the trigger is a user's motion of shifting the armrest 98 or a change in position of the armrest 98.

In this case, the situation corresponds to the record R12 in FIG. 11, the detection processing unit 32 in FIG. 1 causes the graphics display processing unit 31 in FIG. 1 to execute the action in the "action" field of the record R12 in FIG. 11.

In a case in which an action of the record R12 is executed, the app window of the weather forecast app is slid backward together with the armrest 98 similarly to the case of the record R11, and the projection image 141 is slid backward together with the armrest 98 similarly to FIG. 12.

When the armrest 98 is slid in a case in which the user is viewing the weather forecast app, it is considered that the user will continue to use the weather forecast app. Usability is maintained by the app window being slid along with sliding of the armrest 98 as in FIG. 12 and by the entire presentation information of the weather forecast app being projected as the projection image 141.

Next, when the armrest 98 is slid (shifted) backward as in the state B in FIG. 9 in a case in which the user is neither performing an operation on the weather forecast app nor viewing the projection image 141 that is the presentation information of the weather forecast app, the app type is a weather forecast app, the app state is "ordinary", and the trigger is a user's motion of shifting the armrest 98 or a change in position of the armrest 98.

In this case, the situation corresponds to the record R13 in FIG. 11, the detection processing unit 32 in FIG. 1 causes the graphics display processing unit 31 in FIG. 1 to execute the action in the "action" field of the record R13 in FIG. 11.

Figure 13:
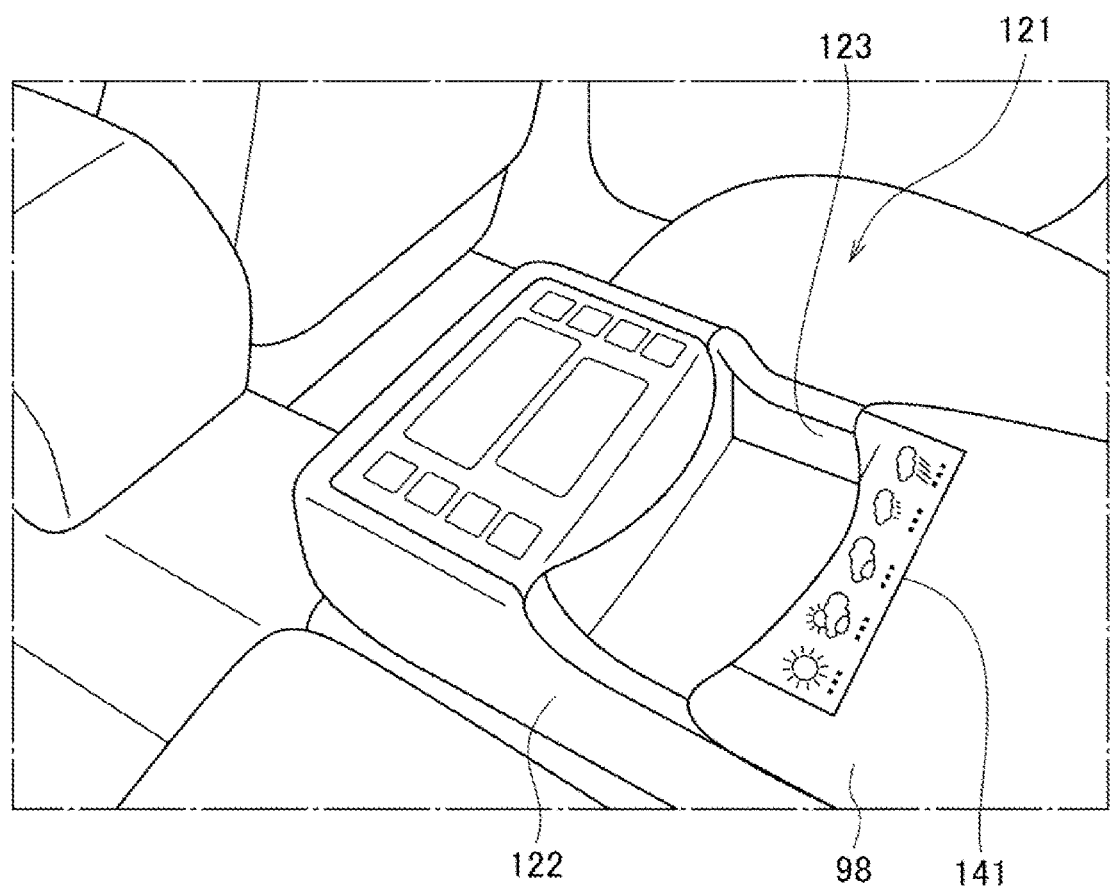
FIG. 13 is a diagram illustrating, as an example, states of the armrest and a projection image when an action of a record R13 in FIG. 11 is executed.

FIG. 13 is a diagram illustrating, as an example, states of the armrest 98 and the projection image 141 when an action of the record R13 in FIG. 11 is executed.

In the action of the record R13, the detection processing unit 32 does nothing on the armrest 98 being slid. Thus, the app window where the presentation information of the weather forecast app is projected is not changed, and the projection image 141 is not slid together with the armrest 98 as in FIG. 13. Therefore, a part of the presentation information of the weather forecast app is missed.

However, since the user is neither performing any operation nor viewing the presentation information, any special disadvantage does not happen if a part of the projection image 141 of the presentation information of the weather forecast app is temporarily missed. It is possible for the user to view the entire presentation information of the weather forecast app by returning the armrest 98 to the standard position in the state A in FIG. 9.

Note that the action in the "action" field of the records R11 to R13 in the action definition table in FIG. 11 can be applied as an action for an arbitrary type of app and an arbitrary presentation location (not limited to a vehicle as well) with the "app state" field and the "trigger" field that can be categorized into a combination similar to that of the records R11 to R13.

In a case in which presentation information of an image viewing app is projected on the armrest 98, for example, it is also possible to apply the action in the "action" field of the records R11 to R13 to a case in which the presentation information of the image viewing app is projected on a presentation location, other than the armrest 98, where a change in state (not limited to a change in state caused by sliding) similar to that of the armrest 98 occurs as well.

(In Case in which Presentation Information of Music App is Projected)

Figure 14:
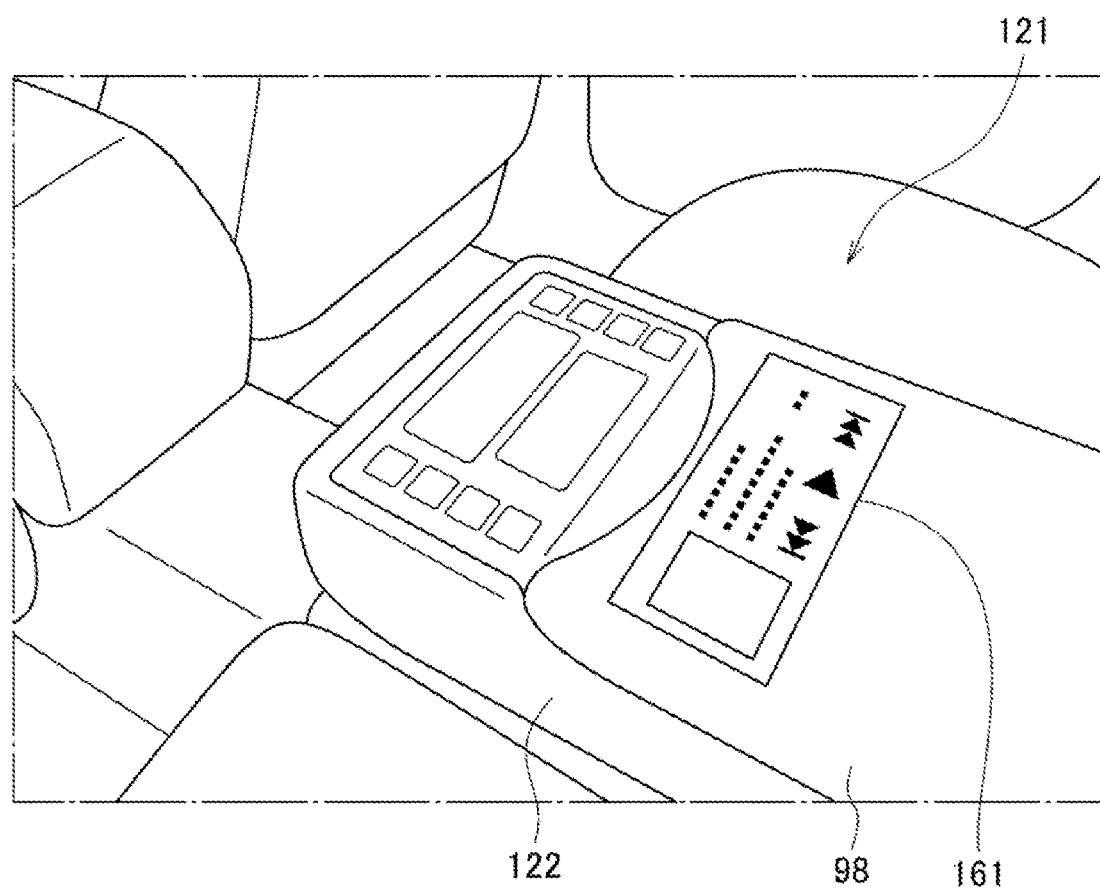
FIG. 14 is a diagram illustrating, as an example, a state in which presentation information of a music app is projected on the armrest.

FIG. 14 is a diagram illustrating, as an example, a state in which presentation information of a music app is projected on the armrest 98.

If the user performs an operation for causing presentation information of the music app to be projected using the armrest 98 as a presentation location in the state A in FIG. 9, the projector 82 in FIG. 6, for example, projects a projection image 161 of the presentation information of the music app to the armrest 98. The projection image 161 is projected on an upper surface of the armrest 98 on the front end side, for example.

FIG. 15 is a diagram illustrating, as an example, a record including a music app in the "app type" field in the action definition table in FIG. 2 stored in the action definition accumulation unit 52 in FIG. 1.

When the user places his/her hand on the armrest 98 to try to slide (shift) the armrest 98 backward in a case in which the music app is replaying a predetermined music or the like at a specific volume or more, the app type is a music app, the app state is "currently replayed" at a specific volume or more, and the trigger is a user's motion of placing his/her hand on the armrest 98 (an action of trying to shift the armrest 98).

In this case, the situation corresponds to the record R31 in FIG. 15, and the detection processing unit 32 in FIG. 1 thus causes the graphics display processing unit 31 to executes the action in the "action" field of the record R31 in FIG. 15.

Figure 16:
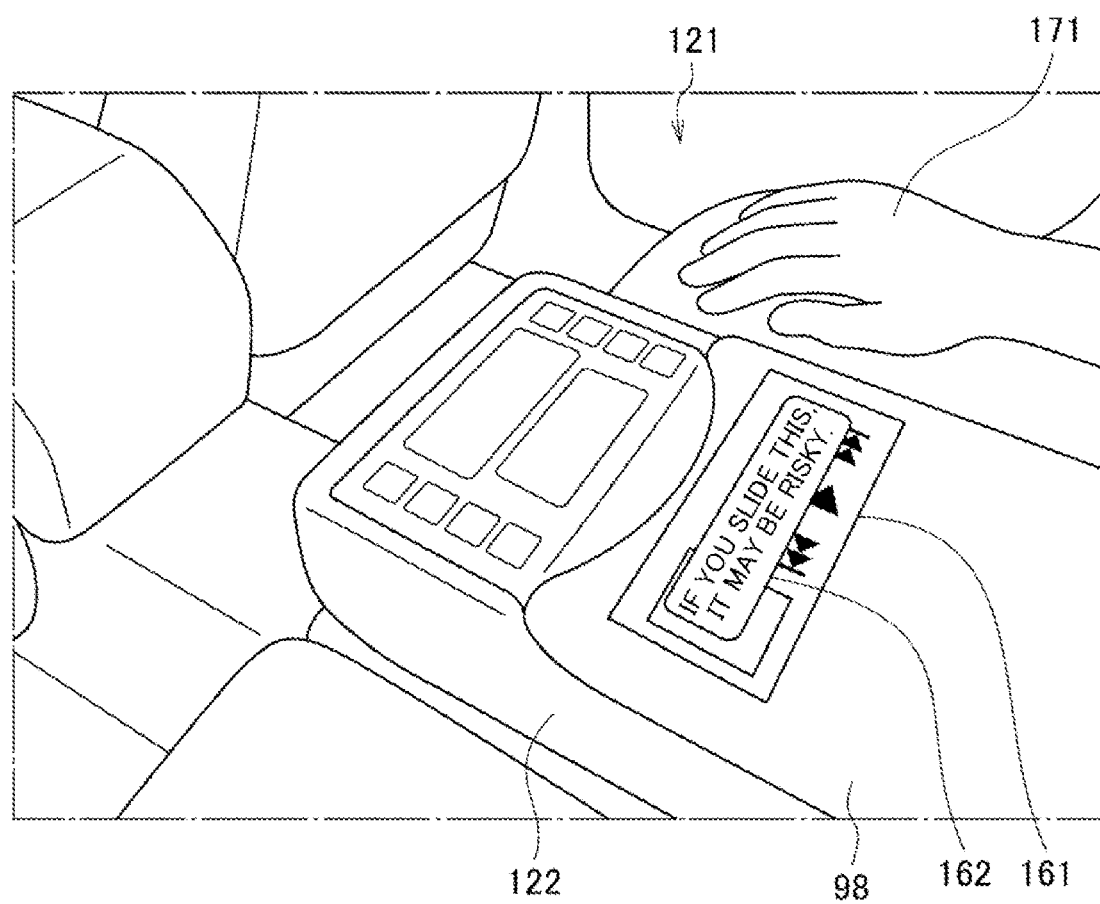
FIG. 16 is a diagram illustrating, as an example, states of the armrest and a projection image when an action of a record R31 in FIG. 15 is executed.

FIG. 16 is a diagram illustrating, as an example, states of the armrest 98 and the projection image 161 when an action of the record R31 in FIG. 15 is executed.

In a case in which the action of the record R31 is executed, an image obtained by superimposing alert information 162 of a text image such as "If you slide this, you cannot perform any operation, and it may be risky" or the like on the projection image 161 of the presentation information of the music app as in FIG. 16 is projected.

The alert information 162 prevents an unexpected situation in which the volume cannot be adjusted due to sliding of the armrest 98 in advance. In other words, if it is not possible to perform the operation of adjusting the volume in a case in which the music app is being replayed at a specific volume or more, the volume may suddenly become very large depending on music. If the user slides the armrest 98, then a part of the presentation information of the music app is missed, and the operation of adjusting the volume may not be able to be performed, the alert information 162 encourages the user not to slide the armrest 98.

In a case in which the user slides (shifts) the armrest 98 backward as in the state B in FIG. 9 regardless of the presentation of the alert information 162 as in FIG. 16, a trigger occurs. The app type in this case is a music app, the app state is "currently replayed at the specific volume or more", and the trigger is the user's motion of shifting the armrest 98 or the change in position of the armrest 98.

In this case, the situation corresponds to the record R32 in FIG. 15, and the detection processing unit 32 in FIG. 1 thus causes the graphics display processing unit 31 to executes the action in the "action" field of the record R32 in FIG. 15.

In a case in which the action of the record R32 is executed, the replaying of the music app is changed to a state of pausing. Note that although not illustrated in the drawing, the app window of the music app is not changed and a part of the presentation information of the music app is missed.

Next, when the user slides (shifts) the armrest 98 backward as in the state B in FIG. 9 in a case in which the music app is replaying a predetermined music or the like at a volume less than the specific volume, the app type is a music app, the app state is "currently replayed at a volume less than the specific volume", and the trigger is the user's motion of shifting the armrest 98 or a change in position of the armrest 98.

In this case, the situation corresponds to the record R33 in FIG. 15, and the detection processing unit 32 in FIG. 1 thus causes the graphics display processing unit 31 to executes the action in the "action" field of the record R33 in FIG. 15.

Figure 17:
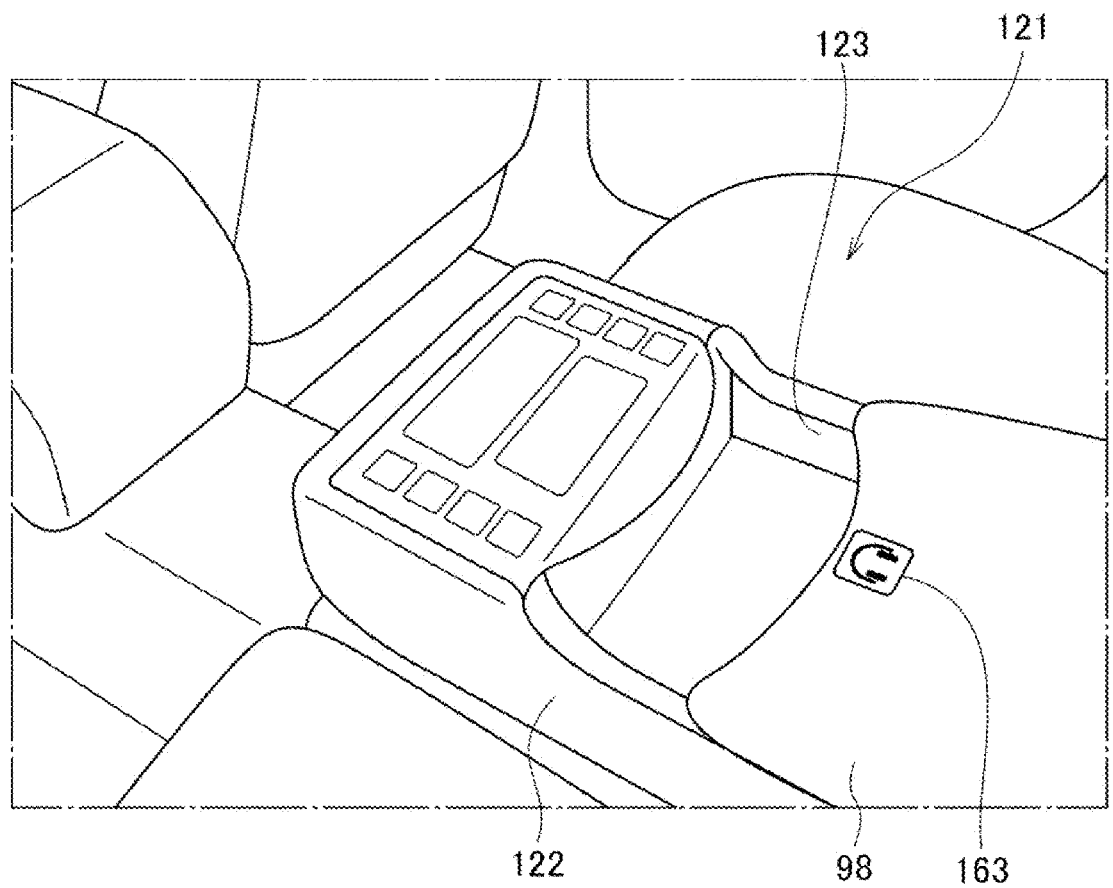
FIG. 17 is a diagram illustrating, as an example, states of the armrest and a projection image when an action of a record R33 in FIG. 15 is executed.

FIG. 17 is a diagram illustrating, as an example, states of the armrest 98 and a projection image when the action of the record R33 in FIG. 15 is executed.

In a case in which the action of the record R33 is executed, the app window where the presentation information of the music app is projected is not changed, and an icon 163 is projected at a position at which the icon 163 can be projected on the armrest 98 within the range of the app window at the position to which the armrest 98 has been slid. Also, an operation based on a gesture in the air above the icon 163 becomes effective, for example, and the user can stop the replaying of the music through the gesture.

The change of the presentation information of the music app from the projection image 161 to the icon 163 is effective particularly in a case in which there is not enough region to project the entire presentation information of the music app in the armrest 98 due to the sliding of the armrest 98.

Next, when the user slides (shifts) the armrest 98 backward as in the state B in FIG. 9 in a case in which the music app is not replaying a music or the like, the app state is a music app, the app state is "ordinary", and the trigger is the user's motion of shifting the armrest 98 or a change in position of the armrest 98.

In this case, the situation corresponds to the record R34 in FIG. 15, the detection processing unit 32 in FIG. 1 causes the graphics display processing unit 31 in FIG. 1 to execute the action in the "action" field of the record R34 in FIG. 15.

Figure 18:
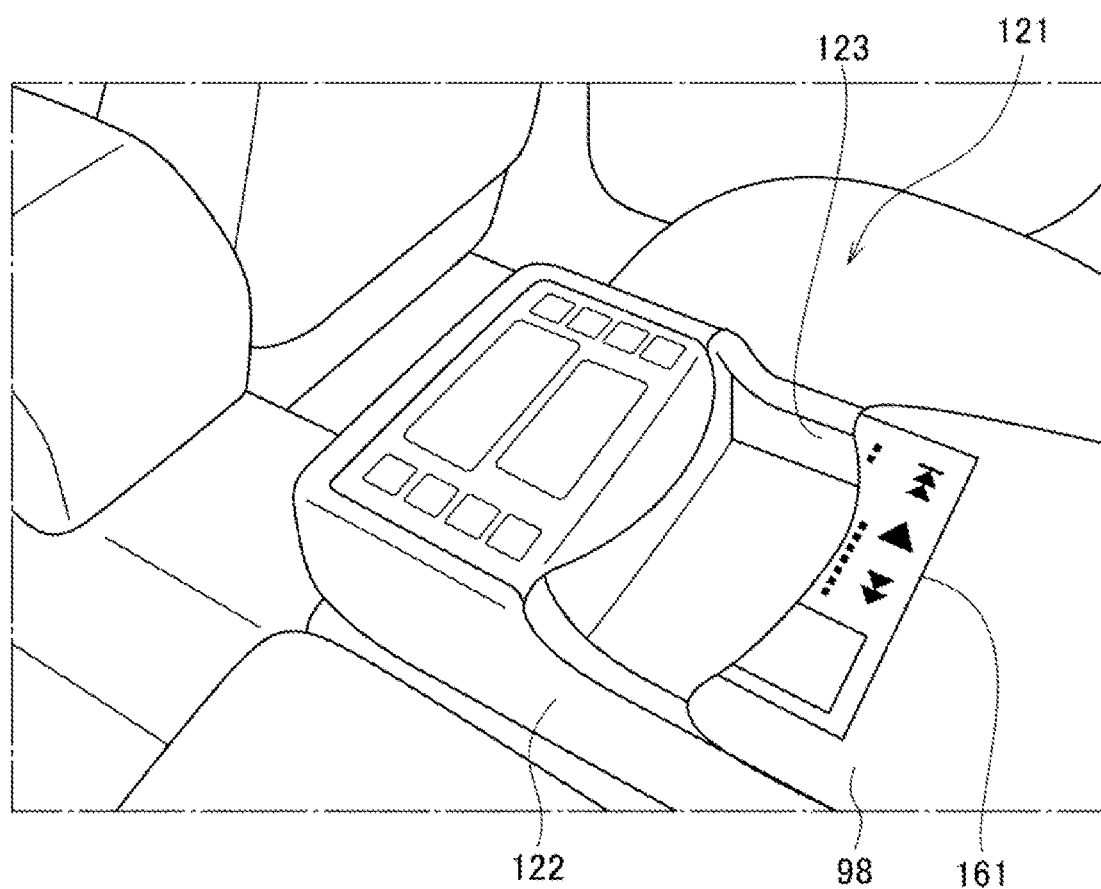
FIG. 18 is a diagram illustrating, as an example, states of the armrest and a projection image when an action of a record R34 in FIG. 15 is executed.

FIG. 18 is a diagram illustrating, as an example, states of the armrest 98 and the projection image 161 when an action of the record R34 in FIG. 15 is executed.

In the action of the record R34, the detection processing unit 32 does nothing in response to the sliding of the armrest 98. In this manner, the app window where the presentation information of the music app is projected is not changed, and the projection image 161 is not slid together with the armrest 98 as in FIG. 18. Therefore, a part of the presentation information of the music app is missed.

Note that the action in the "action" field of the records R31 to R34 in the action definition table in FIG. 15 can be applied as an action for an arbitrary type of app and an arbitrary presentation location (not limited to a vehicle as well) with the "app state" field and the "trigger" field that can be categorized into a combination similar to that of the records R31 to R34.

<In Case in which Dashboard 102 of Front Passenger Seat that can be Opened and Closed is Used as Movable Presentation Location>

(Presentation Information of Car Navigation App is Projected)

Figure 19:
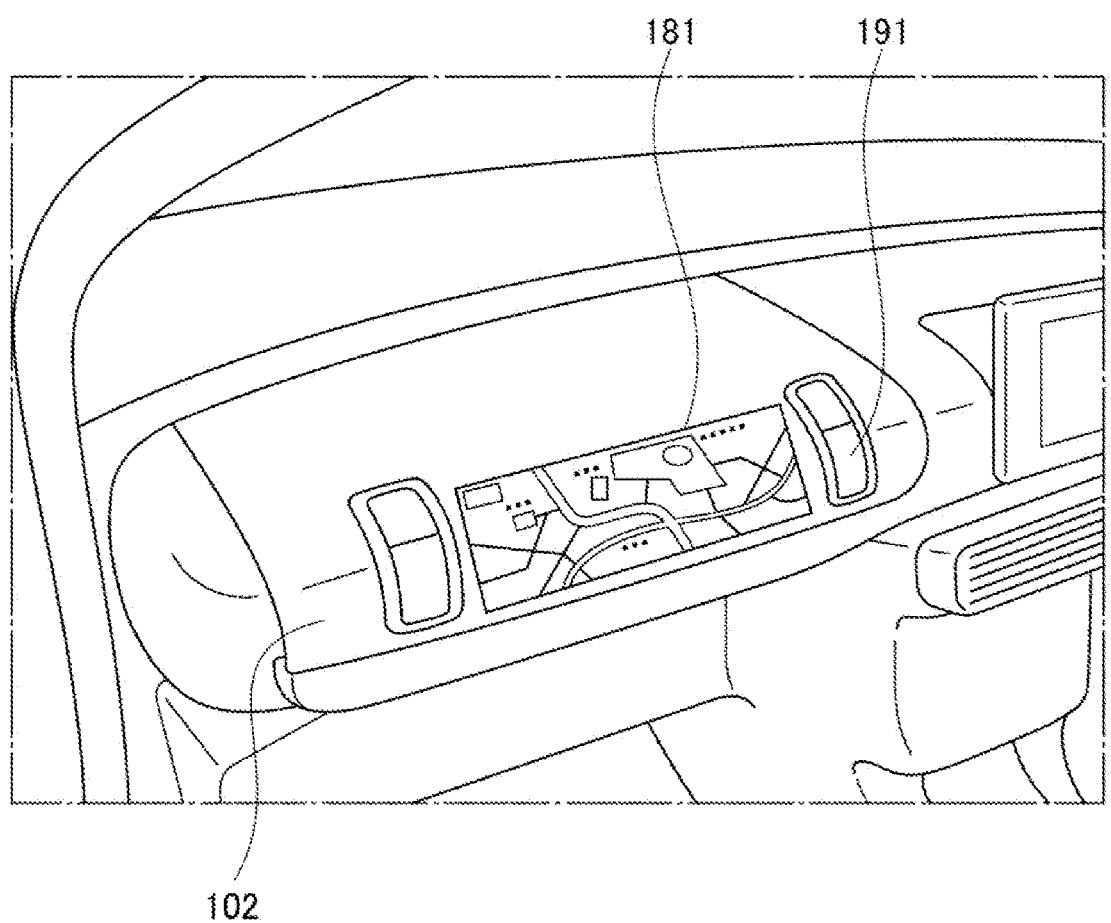
FIG. 19 is a diagram illustrating, as an example, a state in which presentation information of a car navigation app is projected on a dashboard of a front passenger seat.

FIG. 19 is a diagram illustrating, as an example, a state in which presentation information of a car navigation app is projected on the dashboard 102 of the front passenger seat.

In FIG. 19, the presentation information of the car navigation app is projected as a projection image 181 to the dashboard 102 of the front passenger seat by the projector 84 in FIGS. 6 and 7, for example. If the user presses the open/close button 191 for opening/closing the dashboard 102 in a state in which the dashboard 102 is closed as in FIG. 19, a trigger occurs.

FIG. 20 is a diagram illustrating, as an example, a record including a car navigation app and a gourmet app in the "app type" field in the action definition table in FIG. 2 stored in the action definition accumulation unit 52 in FIG. 1. When the user presses the open/close button 191 of the dashboard 102 in a case in which the vehicle 71 is traveling in a state in which the projection image 181 of the presentation information of the car navigation app is projected on the dashboard 102 as in FIG. 19, the app type is a car navigation app, the app state is "currently traveling", and the trigger is a user's motion of pressing the open/close button 191 of the dashboard 102.

In this case, the situation corresponds to the record R51 in FIG. 20, the detection processing unit 32 in FIG. 1 causes the graphics display processing unit 31 in FIG. 1 to execute the action in the "action" field of the record R51 in FIG. 20.

Figure 21:
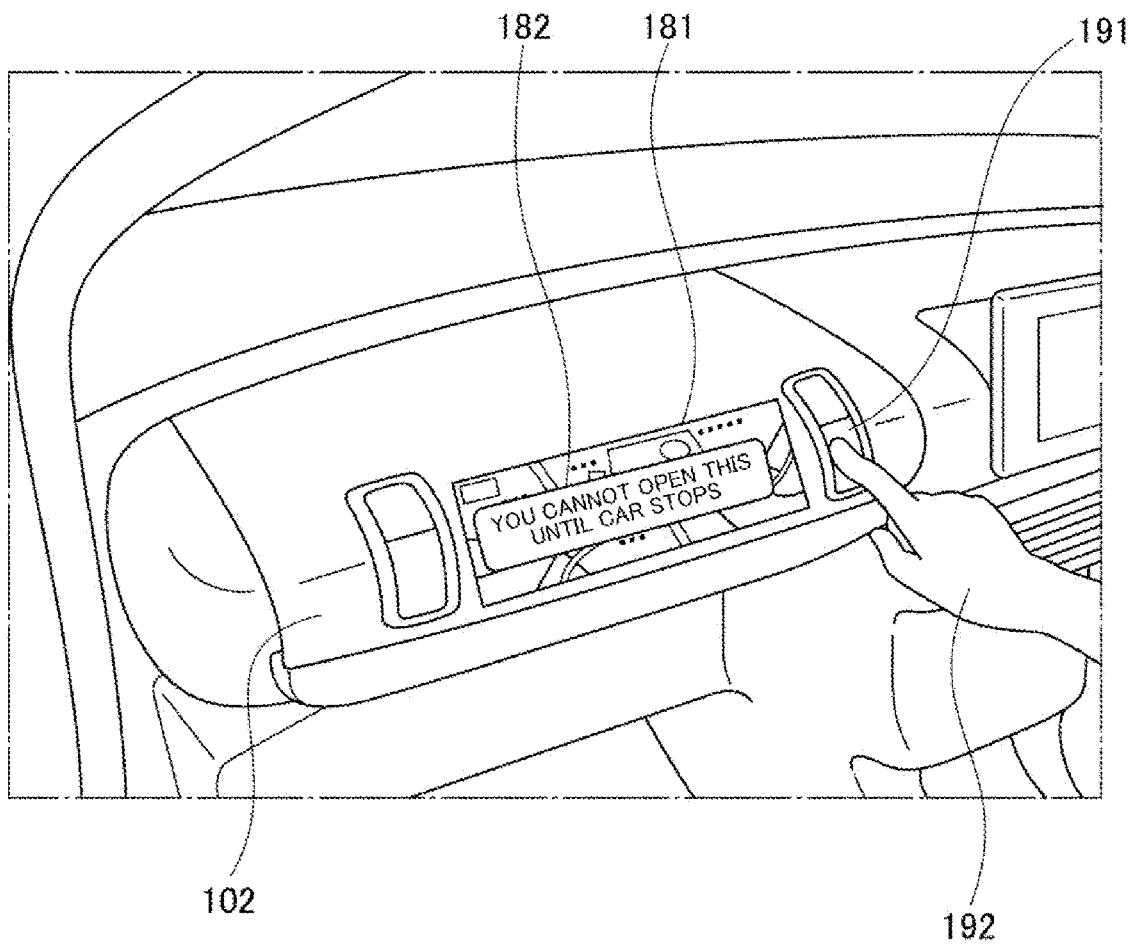
FIG. 21 is a diagram illustrating, as an example, states of a dashboard and a projection image when an action of a record R51 in FIG. 20 is executed.

FIG. 21 is a diagram illustrating, as an example, states of the dashboard 102 and the projection image 181 when the action of the record R51 in FIG. 20 is executed.

If the user presses the open/close button 191 with his/her hand 192 as in FIG. 21, then the trigger occurs, the user the action of the record R51 is executed.

Then, in a case in which the action of the record R51 is executed, an image obtained by superimposing alert information 182 of a text image such as "If you open the dashboard, you cannot see the car navigation, which may cause a problem in your drive and may be risky" or "You cannot open the dashboard before the car stops." on the projection image 181 of the presentation information of the car navigation app.

The alert information 182 encourages the user not to open the dashboard 102 because the presentation information of the car navigation app cannot be seen if the dashboard 102 is opened.

Also, the dashboard 102 is locked in a closed state and is controlled to a state in which the dashboard 102 is not opened if the open/close button 191 is pressed when the vehicle 71 is traveling. Control of the locking mechanism for the dashboard 102 is performed by the detection processing unit 32 transmitting a control signal to the locking mechanism, for example.

Note that a motion of a user's hand (fingers) approaching the open/close button 191 may be used as a trigger instead of using the user's motion of pressing the open/close button 191 as a trigger.

Also, the action of the record R51 may not be executed, and the dashboard 102 may be opened as an action of not doing anything in a case in which the user in the front passenger seat instead of a driver presses the open/close button 191.

Next, when the user presses the open/close button 191 of the dashboard 102 in a case in which the vehicle 71 is stopped in a state in which the projection image 181 of the presentation information of the car navigation app is projected on the dashboard 102, the app type is a car navigation app, the app state is "currently stopped", and the trigger is a motion of the user pressing the open/close button 191 of the dashboard 102.

In this case, the situation corresponds to the record R52 in FIG. 20, the detection processing unit 32 in FIG. 1 causes the graphics display processing unit 31 in FIG. 1 to execute the action in the "action" field of the record R52 in FIG. 20.

Figure 22:
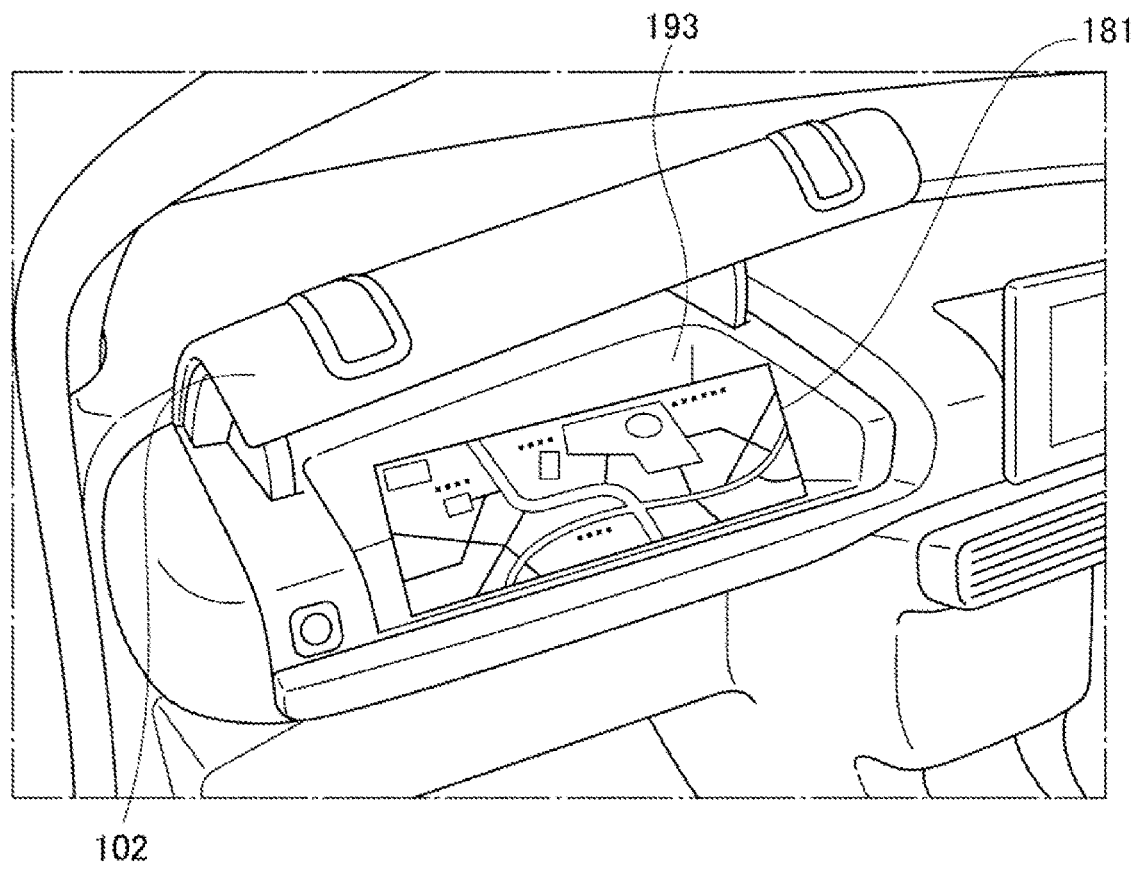
FIG. 22 is a diagram illustrating, as an example, states of the dashboard and a projection image when an action of a record R52 in FIG. 20 is executed.

FIG. 22 is a diagram illustrating, as an example, states of the dashboard 102 and the projection image 181 when the action of the record R52 in FIG. 20 is executed.

In the action of the record R52, the detection processing unit 32 does nothing in response to pressing of the open/close button 191. Thus, the dashboard 102 is opened upward.

If the dashboard 102 is opened, the accommodating portion 193 closed by the dashboard 102 is opened. Also, the projection image 181 projected on the dashboard 102 is projected on the inside of the accommodating portion 193. However, in a case in which some objects are accommodated in the accommodating portion 193, the projection image 181 is projected on the surfaces of the objects and is not always projected on a flat projection surface.

Note that the action in the "action" field of the records R51 and R52 in the action definition table in FIG. 20 can be applied as an action for an arbitrary type of app and an arbitrary presentation location (not limited to a vehicle as well) with the "app state" field and the "trigger" field that can be categorized into a combination similar to that of the records R51 and R52.

Figure 23:
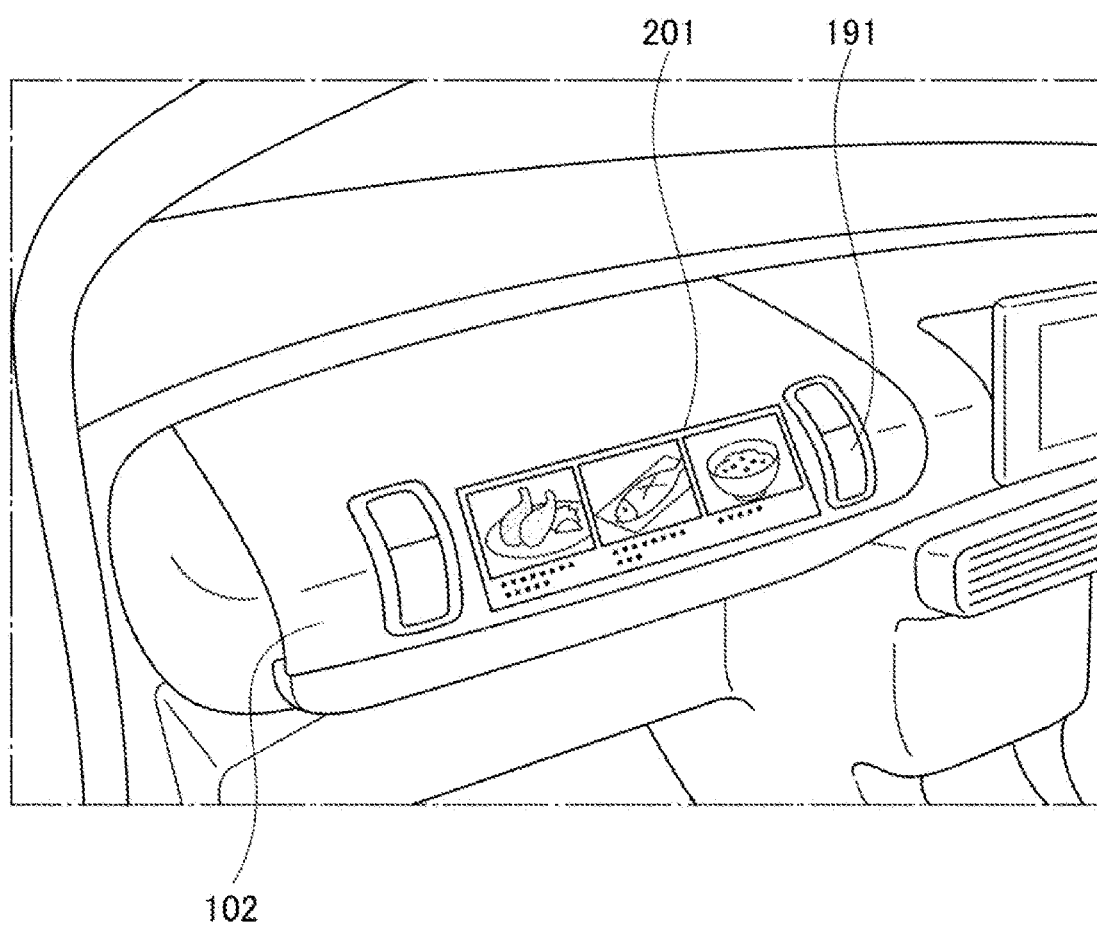
FIG. 23 is a diagram illustrating, as an example, a state in which presentation information of a gourmet app is projected on the dashboard of the front passenger seat.

(In Case in Which Presentation Information of Gourmet App Is Projected) FIG. 23 is a diagram illustrating, as an example, a state in which presentation information of a gourmet app is projected on the dashboard 102 of the front passenger seat.

It is assumed that the user presses the open/close button 191 for opening/closing the dashboard 102 in a state in which a projection image 201 of presentation information of the gourmet app is projected on the dashboard 102 as in FIG. 23. The app type in this case is a gourmet app, the app state is "ordinary", and the trigger is the motion of the user pressing the open/close button 191 of the dashboard 102.

In this case, the situation corresponds to the record R53 in FIG. 20, the detection processing unit 32 in FIG. 1 causes the graphics display processing unit 31 in FIG. 1 to execute the action in the "action" field of the record R53 in FIG. 20.

Figure 24:
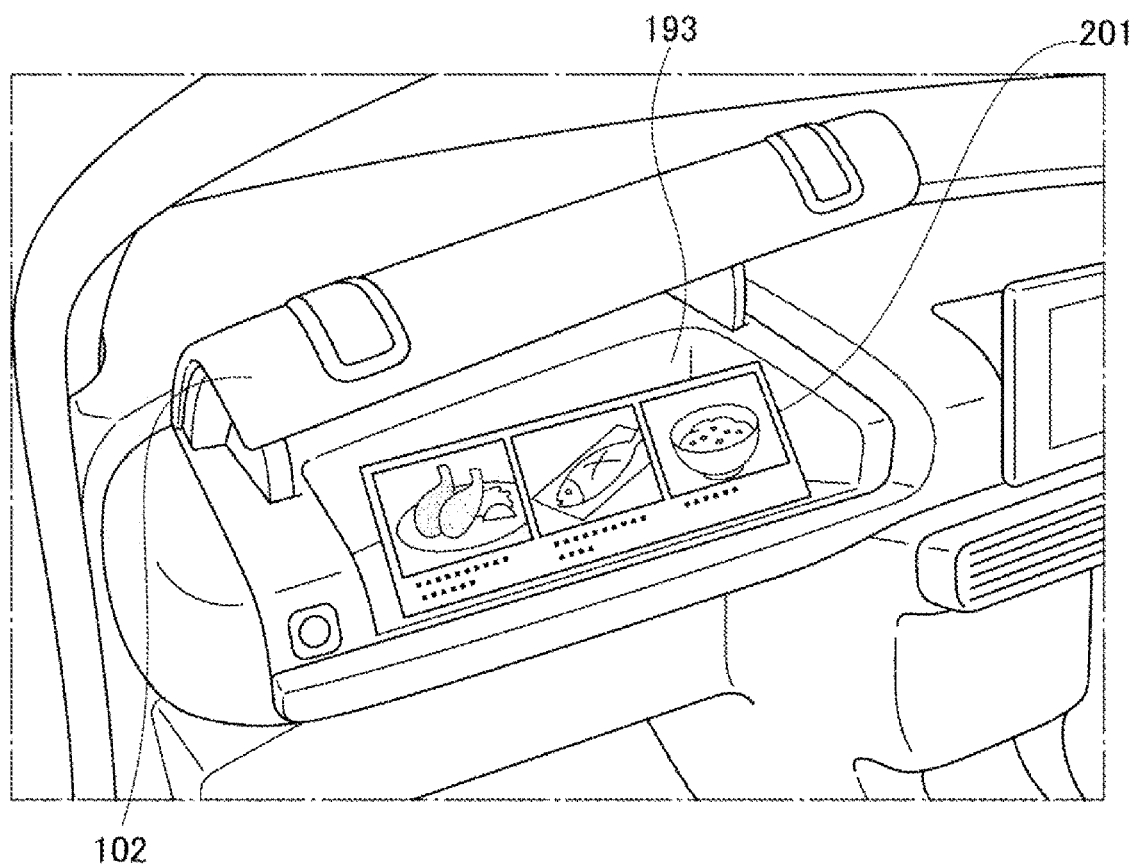
FIG. 24 is a diagram illustrating, as an example, states of the dashboard and a projection image when an action of a record R53 in FIG. 20 is executed.

FIG. 24 is a diagram illustrating, as an example, states of the dashboard 102 and the projection image 201 when the action of the record R53 in FIG. 20 is executed.

In the action of the record R52, the detection processing unit 32 does nothing in response to the pressing of the open/close button 191. Thus, the dashboard 102 is opened upward.

If the dashboard 102 is opened, the accommodating portion 193 closed by the dashboard 102 is opened. Also, the projection image 201 projected on the dashboard 102 is projected on the inside of the accommodating portion 193.

In the case in which the presentation information of the gourmet app is projected on the dashboard 102, no problem occurs in driving even if the dashboard 102 is opened and a state in which the presentation information of the gourmet app cannot be viewed is achieved, and the dashboard 102 is thus opened in response to the user's operation.

<In Case in which Movable Headrest 99 is Used as Movable Presentation Location>

(Presentation Information of Car Navigation App is Projected)

Figure 25:
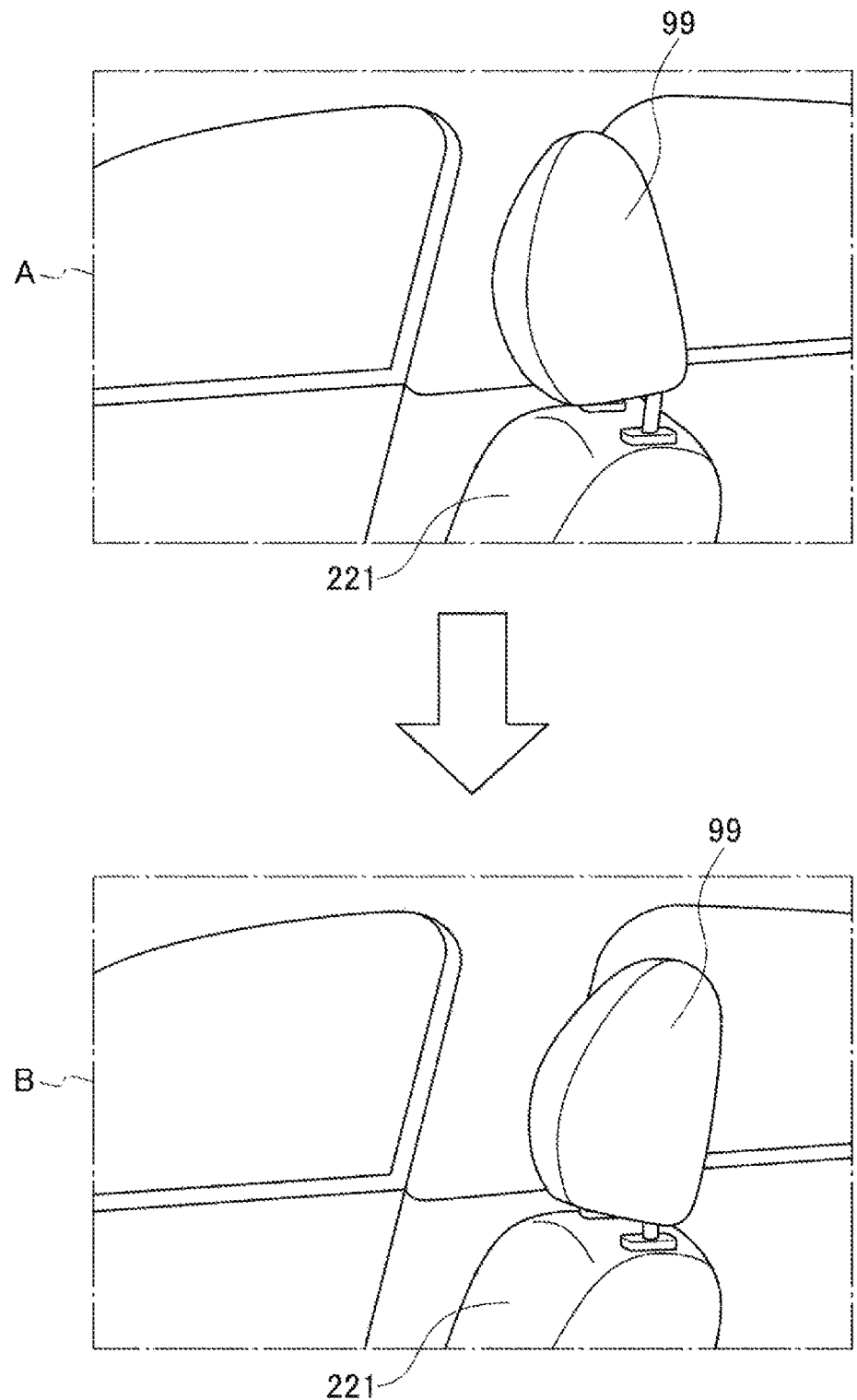
FIG. 25 is a diagram illustrating, as an example, operations of a headrest of a driver seat.

FIG. 25 is a diagram illustrating, as an example, operations of a headrest 99 of a driver seat 221.

In the state A and the state B in FIG. 25, the headrest 99 of the driver seat 221 changes its inclination in the front-back direction through adjustment of an inclination of the backrest of the driver seat 221 or adjustment of an inclination of the headrest 99.

The state A indicates a state in which the headrest 99 is inclined further forward than in the state B, and the state B indicates a state in which the headrest 99 is inclined further backward than in the state A.

If the user performs an operation of causing presentation information of a video app to be projected using a back side of the headrest 99 (hereinafter, simply referred to as a headrest 99) as a movable presentation location in the state A, then the presentation information of the video app is projected on the headrest 99 by the projector 83 in FIGS. 6 and 7, for example.

Figure 26:
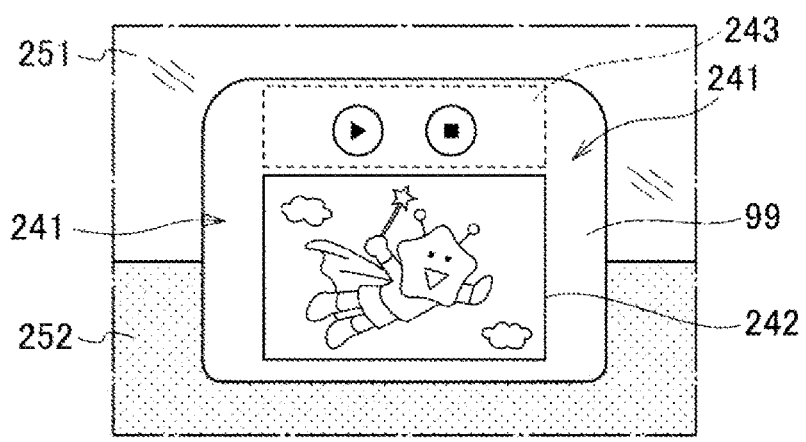
FIG. 26 is a diagram illustrating, as an example, a state in which presentation information of a video app is projected on the headrest in a state A in FIG. 25.

FIG. 26 is a diagram illustrating, as an example, a state in which the presentation information of the video app is projected on the headrest 99 in the state A in FIG. 25.

In FIG. 26, the presentation information of the video app is projected as a projection image 241 to the headrest 99. The projection image 241 includes a replaying portion 242 where a video is presented and an operation portion 243 for operations of replaying or stopping motions. In a state in which the headrest 99 is inclined forward as in the state A in FIG. 25 (a state in which the headrest 99 is at an angle inclined further forward than a predetermined angle of backward inclination), the replaying portion 242 is projected further downward than the operation portion 243.

If the user (the driver or the like) puts the headrest 99 or the driver seat 221 back (reclines it) in a state in which the projection image 241 is projected on the headrest 99 as in FIG. 26, a trigger occurs.

FIG. 27 is a diagram illustrating, as an example, a record including a video app or a weather forecast app in the "app type" field in the action definition table in FIG. 2 stored in the action definition accumulation unit 52 in FIG. 1.

When the user performs reclining from the state A to the state B in FIG. 25 in a case in which the video app is replaying a predetermined video, the app type is a video app, the app state is "currently replayed", and the trigger is the motion of the user performing the reclining or a change in inclination of the driver seat 221 or the headrest 99.

In this case, the situation corresponds to the record R71 in FIG. 27, the detection processing unit 32 in FIG. 1 causes the graphics display processing unit 31 in FIG. 1 to execute the action in the "action" field of the record R71 in FIG. 27.

Figure 28:
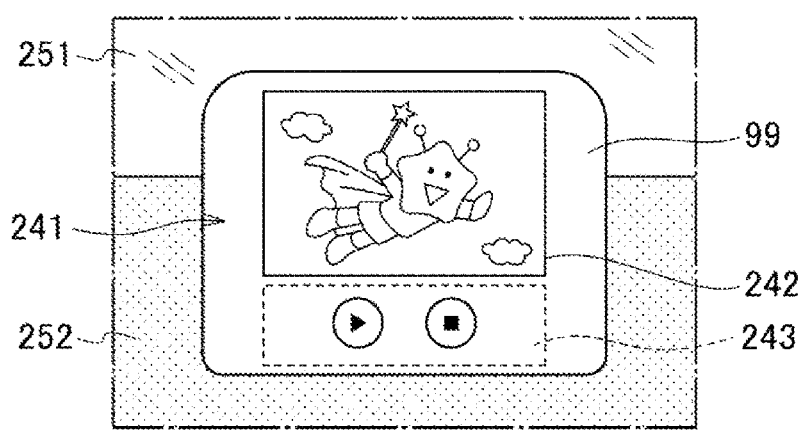
FIG. 28 is a diagram illustrating, as an example, states of the headrest and a projection image when an action of a record R71 in FIG. 27 is executed.

FIG. 28 is a diagram illustrating, as an example, states of the headrest 99 and the projection image 241 when the action of the record R71 in FIG. 27 is executed.

In a case in which the action of the record R71 is executed, the positions of the replaying portion 242 and the operation portion 243 in the projection image 241 are swapped in the up-down direction in accordance with the inclination of the headrest 99.

In a case in which the headrest 99 is inclined backward as in the state B in FIG. 25 (in a case in which the headrest 99 is inclined further backward than a predetermined inclination angle), the replaying portion 242 in the projection image 241 is projected further upward than the operation portion 243 as in FIG. 28. In this manner, the sight direction of the user who is viewing the replaying portion 242 is prevented from significantly changing from that before the reclining is performed.

On the other hand, in a case in which the user performs reclining from the state A to the state B in FIG. 25 when the video app is not being replayed, the app type in this case is a video app, the app state is "ordinary", and the trigger state is the motion of the user of performing the reclining or a change in inclination of the driver seat or the headrest 99.

In this case, the situation corresponds to the record R72 in FIG. 27, the detection processing unit 32 in FIG. 1 causes the graphics display processing unit 31 in FIG. 1 to execute the action in the "action" field of the record R72 in FIG. 27.

Figure 29:
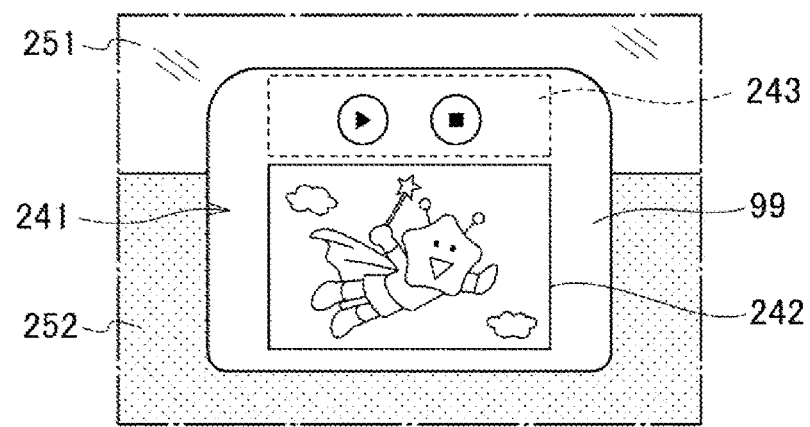
FIG. 29 is a diagram illustrating, as an example, states of the headrest and a projection image when an action of a record R72 in FIG. 27 is executed.

FIG. 29 is a diagram illustrating, as an example, states of the headrest 99 and the projection image 241 when the action of the record R72 in FIG. 27 is executed.

In the action of the record R72, the detection processing unit 32 does nothing in response to the reclining. Therefore, disposition of the replaying portion 242 and the operation portion 243 in the projection image 241 are the same as that in the case in FIG. 26 where the replaying portion 242 is disposed on the lower side and the operation portion 243 is disposed on the upper side.

Note that the replaying portion 242 may be projected further upward than the operation portion 243 even when the video app is not being not replayed in a case in which the reclining is performed, similarly to a case where the video app is replaying a video.

Figure 30:
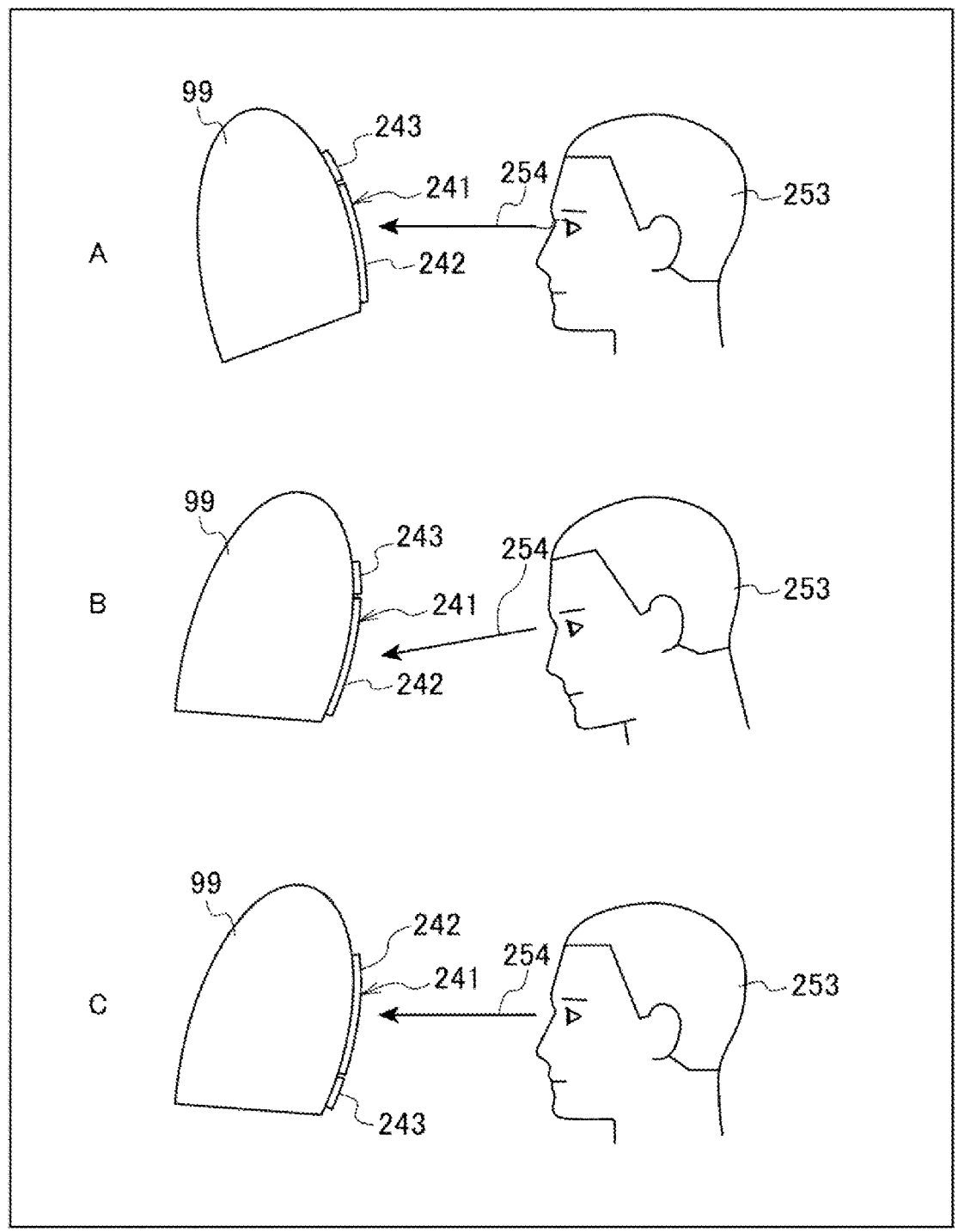
FIG. 30 is a diagram illustrating, as an example, a sight direction of a user who is viewing a projection image on the headrest on which presentation information of a video app is projected.

FIG. 30 is a diagram illustrating, as an example, a sight direction 254 of a user 253 who is viewing the projection image 241 on the headrest 99 where the presentation information of the video app is projected.

A in FIG. 30 represents the sight direction 254 of the user 253 when the projection image 241 on the headrest 99 has a layout in which the replaying portion 242 is disposed on the lower side and the operation portion 243 is disposed on the upper side in a state in which the headrest 99 is inclined forward as in the state A in FIG. 25. In A in FIG. 30, the sight direction 254 of the user 253 is substantially a horizontal direction, for example.

FIGS. 26, 28, and 29 illustrate a boundary between a front glass 251 and an impermeable part 252 (an instrument panel or a dashboard), and the sight of the user 253 in the sight direction 254 in A In FIG. 30 is as illustrated in FIG. 26.

In FIG. 26, the peripheral vision of the user includes a large part of landscape outside the vehicle via the front glass 251, and the user can thus be conscious of the speed and shaking of the vehicle 71 while seeing the video in the replaying portion 242 and is unlikely to get carsick.

B in FIG. 30 represents the sight direction 254 of the user 253 when the projection image 241 on the headrest 99 has a layout in which the replaying portion 242 is disposed on the lower side and the operation portion 243 is disposed on the upper side similarly to A in FIG. 30 in a state in which the headrest 99 is inclined backward as in the state B in FIG. 25.

In B in FIG. 30, the sight direction 254 of the user 253 is a downward direction, and the sight of the user 253 is as illustrated in FIG. 29. In FIG. 29, a less part of landscape outside the vehicle via the front glass 251 is included in the peripheral vision of the user, and the user is thus likely to get carsick.

C in FIG. 30 represents the sight direction 254 of the user 253 when the projection image 241 on the headrest 99 has a layout in which the replaying portion 242 is disposed on the upper side and the operation portion 243 is disposed on the lower side in a state in which the headrest 99 is inclined backward as in the state B in FIG. 25.

In C in FIG. 30, the sight direction 254 of the user 253 is substantially horizontal similarly to that in A in FIG. 30, and the sight of the user 253 is as illustrated in FIG. 28. FIG. 28 is a diagram for explaining the layout of the projection image 241 in which the replaying portion 242 is disposed on the upper side and the operation portion 243 is disposed on the lower side, and how the peripheral vision of the user looks like is not appropriately expressed. However, since a large part of the landscape outside the vehicle via the front glass 251 is included in the peripheral vision of the user similarly to the case in A in FIG. 30 if a part near the center of the replaying portion 242 is assumed to be the center of the sight, the user is unlikely to get carsick.

Thus, in a case in which reclining is performed when the video is being replayed, the projection image 241 in which the replaying portion 242 is disposed on the upper side and the operation portion 243 is disposed on the lower side is projected as in FIGS. 28 and C in FIG. 30.

On the other hand, when reclining is performed in a case in which presentation information of a weather forecast app is projected on the headrest 99, the action of the record R73 in FIG. 27 is executed. In this case, the detection processing unit 32 in FIG. 1 does nothing in response to the reclining. In a case of the presentation information of the weather forecast app, the user does not continue to pay close attention to the projection image unlike the case of the presentation information of the video app, and carsick is not taken into consideration.

Note that although the motion of the user performing reclining (or a change in inclination of the driver seat or the headrest 99) is defined as a trigger in the action definition table in FIG. 27, a motion of the user moving the reclining including a motion of the user returning the reclining or a change in inclination of the reclining may be defined as a trigger.

In this case, if the inclination angle of the reclining becomes an angle located further forward than a predetermined angle or if the amount of change of the inclination angle of the reclining to the forward direction is greater than a predetermined amount, the replaying portion 242 of the projection image 241 is projected further downward than the operation portion 243.

Also, in a case in which the inclination angle of the reclining becomes an angle inclined further backward than the predetermined angle, or in a case in which the amount of change in the inclination angle of the reclining to the backward direction is greater than the predetermined amount, the replaying portion 242 of the projection image 241 is disposed further upward than the operation portion 243.

Also, even in a case in which a headrest of a seat other than the front passenger seat or the like is used as a movable presentation location, processing similar to that in the case in which the headrest 99 of the driver seat 221 is used as the movable presentation location can be applied.

Note that the action in the "action" field of the records R71 and R72 in the action definition table in FIG. 27 can be applied as an action for an arbitrary type of app and an arbitrary presentation location (not limited to a vehicle as well) with the "app state" field and the "trigger" field that can be categorized into a combination similar to that of the records R71 and R72.

<In Case in which Right Door Glass 96 of Rear Seat is Used as Movable Presentation Location>
(In Case in which Presentation Information of Video App is Projected)

Figure 31:
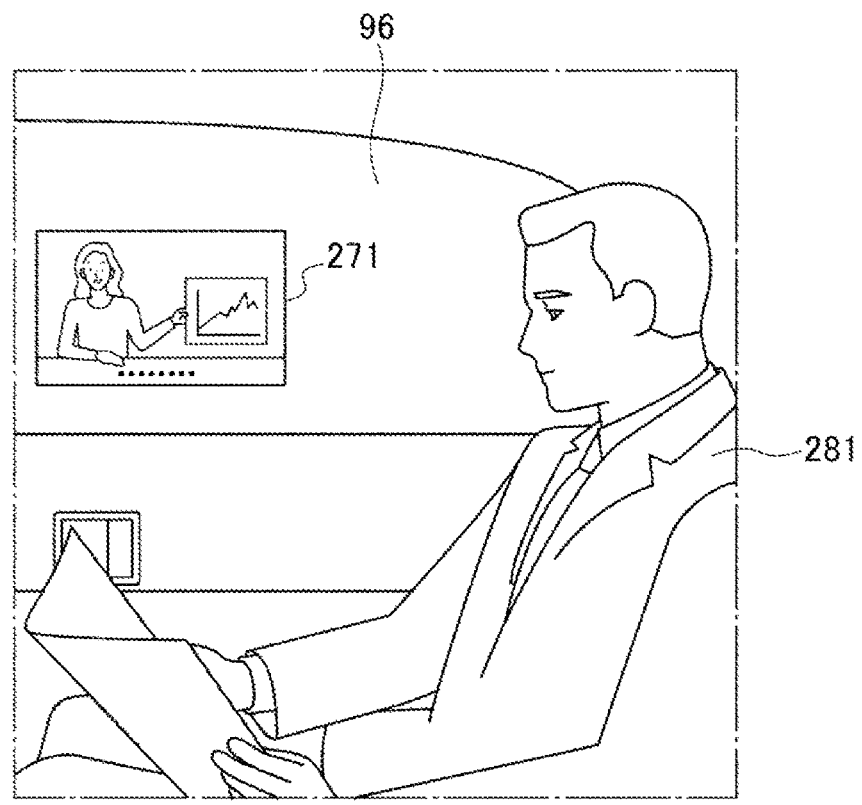
FIG. 31 is a diagram illustrating, as an example, a state in which presentation information of a video app is projected on a right door glass of a rear seat.

FIG. 31 is a diagram illustrating, as an example, a state in which presentation information of a video app is projected on the right door glass 96 of the rear seat.

If the user performs an operation of causing the presentation information of the video app to be projected on the right door glass 96 (see FIG. 8) of the rear seat as a movable presentation location, then the presentation information of the video app is projected as a projection image 271 to the right door glass 96 as in FIG. 31 by the projector 83 in FIG. 6, for example.

If the user 281 or the like opens the window (right door glass 96) or opens the door (right door) in the state in which the projection image 271 is projected on the right door glass 96 as in FIG. 31, then a trigger occurs.

FIG. 32 is a diagram illustrating, as an example, a record including a video app in the "app type" field in the action definition table in FIG. 2 stored in the action definition accumulation unit 52 in FIG. 1.

When the user 281 or the like opens the window in a case in which the video app is replaying a predetermined video, the app type is a video app, the app state is "currently replayed", and the trigger is a motion of the user opening the window or displacement caused by lowering of the window (right door glass 96).

In this case, the situation corresponds to the record R91 in FIG. 32, the detection processing unit 32 in FIG. 1 causes the graphics display processing unit 31 in FIG. 1 to executes the action in the "action" field of the record R91 in FIG. 32.

Figure 33:
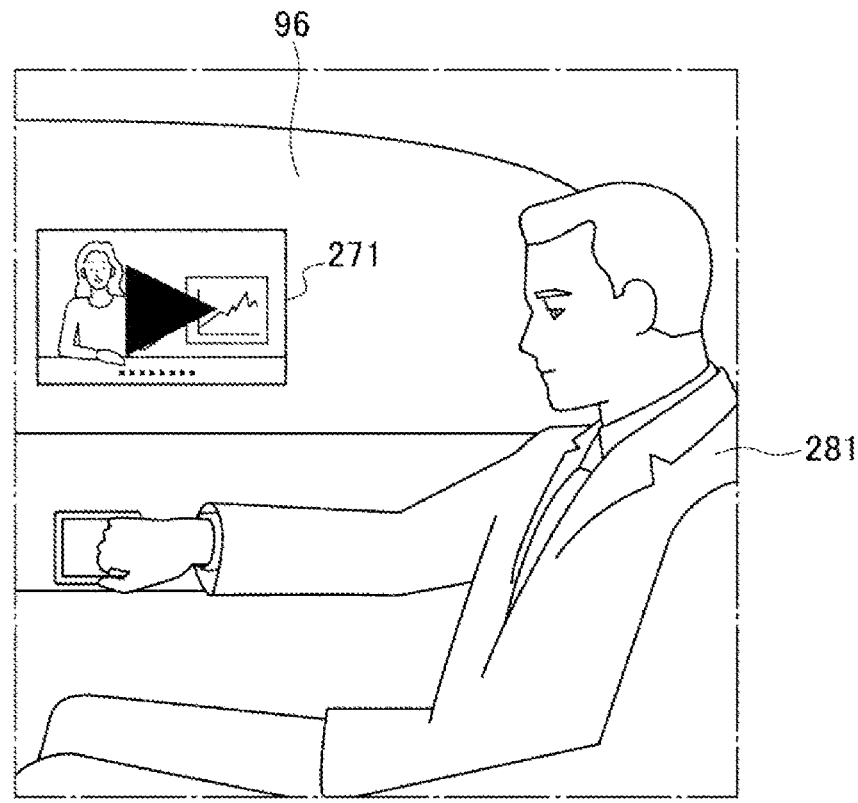
FIG. 33 is a diagram illustrating, as an example, states of the right door glass and a projection image when an action of a record R91 in FIG. 32 is executed.

FIG. 33 is a diagram illustrating, as an example, states of the right door glass 96 and the projection image 271 when the action of the record R91 in FIG. 32 is executed.

If the user 281 operates a power window switch in an opening direction, for example, the action of the record R91 is executed, and replaying of the video performed by the video app is temporarily paused.

In this manner, the replaying of the video is prevented from advancing in a state in which the right door glass 96 has been lowered and it is not possible to project the projection image 271.

On the other hand, when the user 281 or the like opens the window in a case in which the video app is not replaying the video, the app type is a video app, the app state is "ordinary", and the trigger is the motion of the user opening the window or displacement caused by lowering of the window.

In this case, the situation corresponds to the record R92 in FIG. 32, the detection processing unit 32 in FIG. 1 causes the graphics display processing unit 31 in FIG. 1 to executes the action in the "action" field of the record R92 in FIG. 32.

In the action of the record R92, the detection processing unit 32 does nothing in response to the opening of the window.

Next, when the user 281 or the like opens the right door of the rear seat in a case in which the video app is replaying the video or in a case of "ordinary", the app type in this case is a video app, the app state is "currently replayed" or "ordinary", and the trigger is a motion of the user opening the door or displacement of the door.

In this case, the situation corresponds to the record R93 in FIG. 32, the detection processing unit 32 in FIG. 1 causes the graphics display processing unit 31 in FIG. 1 to executes the action in the "action" field of the record R93 in FIG. 32. Note that different records are supposed to be prepared in a case in which the app state is "ordinary" and in a case in which the app state is "currently replayed", the difference is abbreviated, and the records are assumed to be the same record.

In a case in which the action of the record R93 is executed, the video that the video app is replaying is temporarily paused, and the projector (projector 83) projecting the projection image 271 is turned off. Note that all the projectors may be turned off. In this manner, the situation in which light from the projectors is emitted toward the eyes of the user moving up or down is prevented.

Note that it is possible to apply processing similar to that in the case in which the right door glass 96 of the rear seat is used as a movable presentation location even in a case in which another door glass such as a left door glass 94 of the rear seat or a door glass 101 of the front passenger seat is used as a movable presentation location.

Also, the action in the "action" field of the records R91 and R92 in the action definition table in FIG. 32 can be applied as an action for an arbitrary type of app and an arbitrary presentation location (not limited to a vehicle as well) with the "app state" field and the "trigger" field that can be categorized into a combination similar to that of the records R91 and R92.

Moreover, the action in the "action" field of the record R93 in the action definition table in FIG. 32 can be applied as an action for an arbitrary type of app and an arbitrary presentation location (not limited to a vehicle as well) with an "app state" field and a "trigger" field that can be categorized into a combination (the app state is "ordinary" and "currently replayed" and the trigger is a change in state of the presentation location) similar to that of the record R93.
<In Case in which Ceiling with Sunroof is Used as Movable Presentation Location>
(In Case in which Presentation Information of Map App is Projected)

Figure 34:
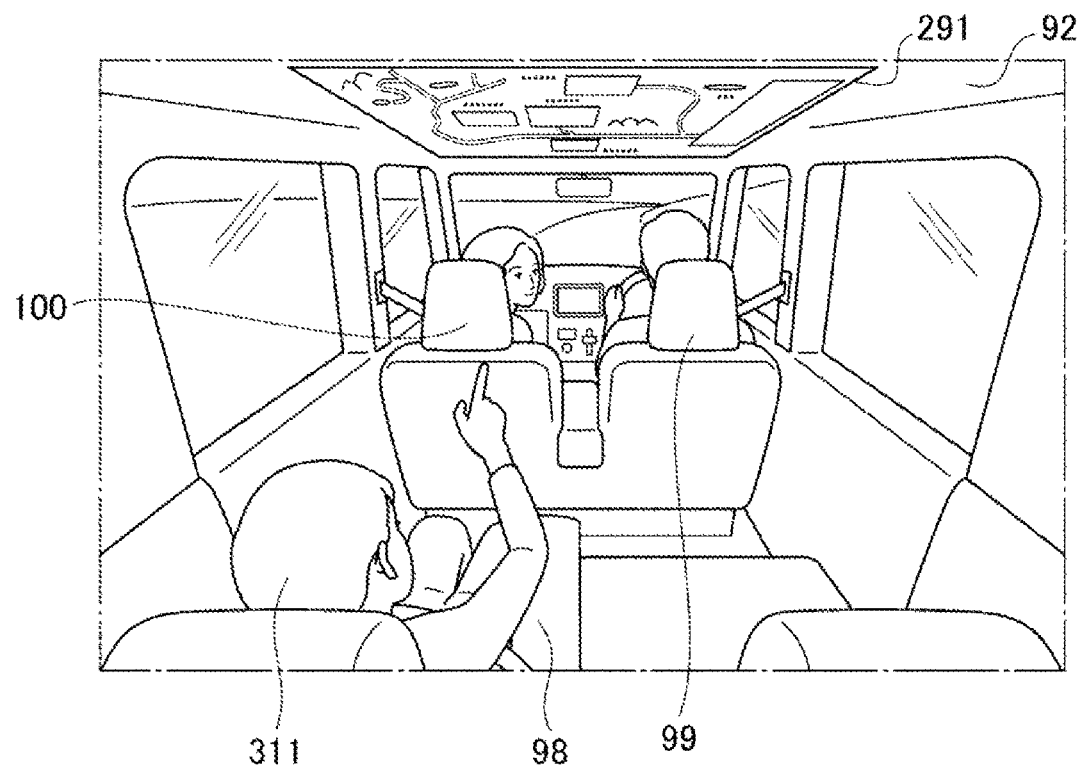
FIG. 34 is a diagram illustrating, as an example, a state in which presentation information of a map app is projected on a ceiling.

FIG. 34 is a diagram illustrating, as an example, a state in which presentation information of a map app is projected on the ceiling 92.

If a user 311 or the like performs an operation of causing the presentation information of the map app to be projected on a part of the ceiling 92 including a sunroof as a movable presentation location, then the presentation information of the map app is projected as a projection image 291 to the ceiling 92 by the projector 81 in FIGS. 6 and 7, for example.

Note that in FIG. 34, the sunroof is assumed to be a state in which light is blocked with a slide panel, for example. If the slide panel is slid and retreats from the part corresponding to the sunroof, then the sunroof is brought into a light transmitting state. In the following description, bringing of the sunroof into the light transmitting state will be referred to as opening of the sunroof.

FIG. 35 is a diagram illustrating, as an example, a record including a map app in the "app type" field in the action definition table in FIG. 2 stored in the action definition accumulation unit 52 in FIG. 1.

When the user 311 or a user other than the user 311 opens the sunroof in a case in which the user 311 is performing an operation on the map app in the state in which a projection image 291 of the presentation information of the map app is projected on the ceiling 92, the app type is a map app, the app state is "currently operated", and the trigger is the motion of the user opening the sunroof or a change in sunroof into an open position.

In this case, the situation corresponds to the record R111 in FIG. 35, the detection processing unit 32 in FIG. 1 causes the graphics display processing unit 31 in FIG. 1 to execute the action in the "action" field of the record R111 in FIG. 35.

Also, when the user 311 or another user opens the sunroof when the user 311 is viewing the projection image 291 that is the presentation information of the map app, the app type is a map app, the app state is "currently viewed", and the trigger is the motion of the user opening the sunroof or a change in sunroof (slide panel) from the closed position.

In this case, the situation corresponds to the record R112 in FIG. 35, the detection processing unit 32 in FIG. 1 causes the graphics display processing unit 31 in FIG. 1 to execute the action in the "action" field of the record R112 in FIG. 35.

Figure 36:
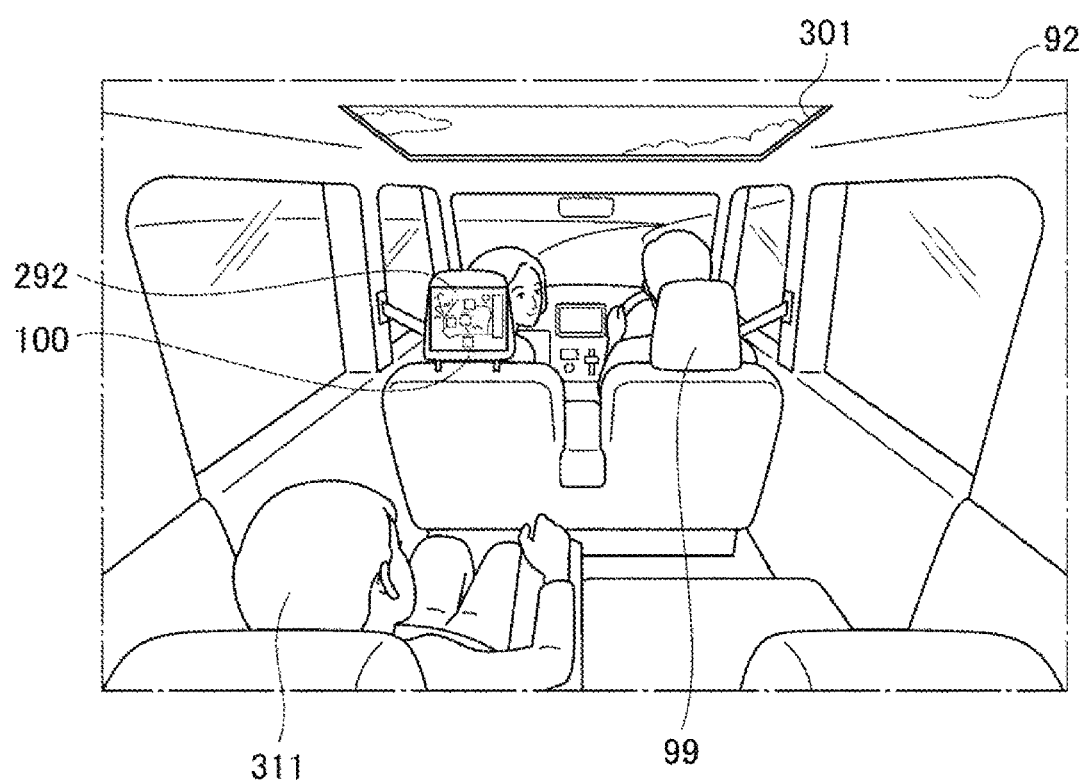
FIG. 36 is a diagram illustrating, as an example, states of the inside of the vehicle and a projection image when a record R111 or a record R112 in FIG. 35 is executed.

FIG. 36 is a diagram illustrating, as an example, states of the inside of the vehicle and a projection image when the record R111 or the record R112 in FIG. 35 is executed.

In a case in which the actions of the record R111 and the record R112 may be the same, and the action of the record R111 or the record R112 is executed, the presentation location where the presentation information of the map app is projected moves from the ceiling 92 (sunroof 301) to the headrest 100, for example, and the presentation information of the map app is projected as a projection image 292 to the headrest 100.

The user 311 can thus continuously use the map app even in a case in which the sunroof is opened when the user 311 is performing an operation on the map app projected on the ceiling 92 or viewing the projection image 291.

Here, the presentation location after the movement where the presentation information is projected is a presentation location at a position at which the user (target) who has performed an operation or has viewed the presentation information can view the presentation information. In FIG. 36, since the user 311 in the rear seat is the user who has performed an operation or has viewed the presentation information, the headrest 99 of the front passenger seat viewed by the user 311 is the presentation location after the movement.

As the presentation location at the position at which the target can see the presentation information, an ordinary monitor attached to the dashboard or the like, and the door glass of the front seat correspond to the presentation location for the target in the front seat, and the headrests 99 and 100 of the front seat, the door glass of the rear seat, or the like correspond to the presentation location for the target in the rear seat. Note that in a case in which presentation information of an app is displayed on the ordinary monitor, the ordinary monitor is included as a component of the output unit 24 in FIG. 1.

When the sunroof is opened in a case in which all the users are neither performing any operation on the map app nor viewing the projection image 291 in the state in FIG. 34, the app type is a map app, the app state is "ordinary", and the trigger is the motion of the user opening the sunroof or a change in sunroof (slide panel) from the closed position.

In this case, the situation corresponds to the record R113 in FIG. 35, the detection processing unit 32 in FIG. 1 causes the graphics display processing unit 31 in FIG. 1 to execute the action in the "action" field of the record R113 in FIG. 35.

In the action of the record R113, the detection processing unit 32 does nothing in response to the opening of the sunroof.

Since nobody is using the map app, no problem occurs even if the map app is temporarily unavailable.

Note that the action in the "action" field of the records R111 to R113 in the action definition table in FIG. 35 can be applied as an action for an arbitrary type of app and an arbitrary presentation location (not limited to a vehicle as well) with the "app state" field and the "trigger" field that can be categorized into a combination similar to that of the records R111 to R113.

<<Application Example 2 of Information Processing Device 11>>

As Application Example 2 of the information processing device 11 in FIG. 1, a case in which the information processing device 11 is applied as a projection device that causes a presentation information of various app (discussion app) to be projected on a movable presentation location inside a room such as a conference room will be described.

Figure 37:
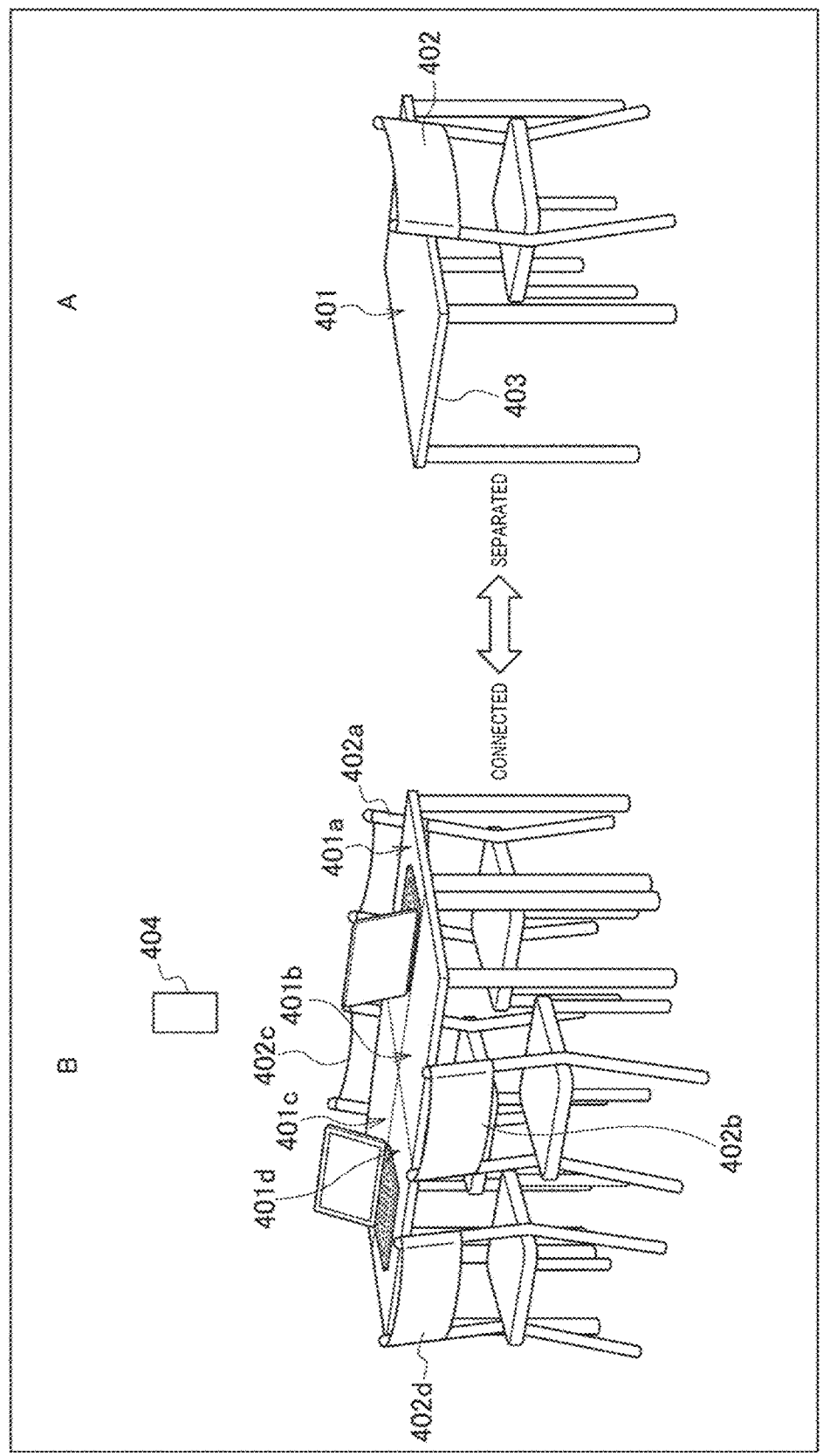
FIG. 37 is a diagram for explaining disposition of tables in a case in which top plates of the tables inside a room such as a conference room are used as movable presentation locations.

FIG. 37 is a diagram for explaining disposition of tables in a case in which top plates of the tables inside a room such as a conference room are used as movable presentation location.

A in FIG. 37 illustrates a set of a table 401 and a chair 402 placed inside a room. B in FIG. 37 illustrates, as an example, a state in which four top plates 403 of the tables 401 in A in FIG. 37 are connected and are arranged into 2×2 in the lateral and longitudinal directions for a conference or the like, and the tables 401 and the chairs 402 are represented as tables 401a to 401d and chairs 402a to 402d. Also, a projector 404 is mounted on the ceiling in the room.

<In Case in which Tables (Top Plates) are Used as Movable Presentation Locations>

Figure 38:
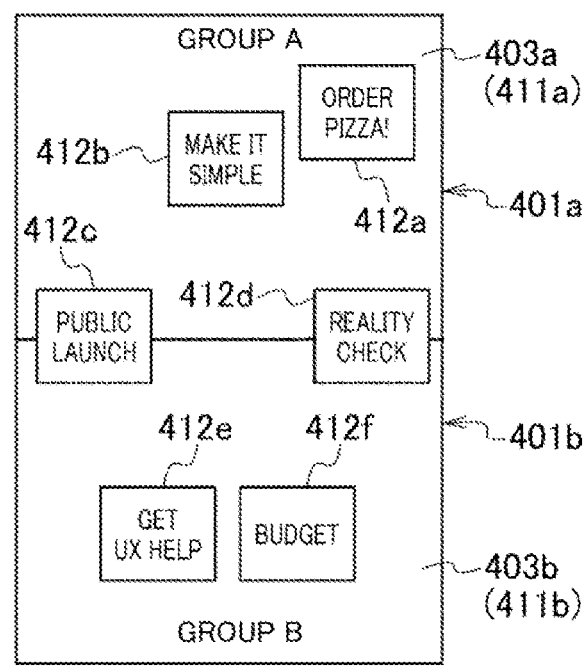
FIG. 38 is a diagram illustrating, as an example, a state in which presentation information of a discussion app is projected on connected top plates of two tables.

FIG. 38 illustrates, as an example, a state in which presentation information of a discussion app is projected on the connected top plates of two tables 401a and 401b.

In FIG. 38, the top plate 403a represents the top plate of the table 401a while the top plate 403b represents the top plate of the table 401b. The top plate 403a and the top plate 403b are connected on the upper and lower sides in the drawing such that the top plate 403a and the top plate 403b face each other with substantially no gap therebetween, and (upper surfaces of) the top plate 403a and the top plate 403b are used as a presentation location where presentation information of the discussion app is projected.

A projection image 411a and a projection image 411b represents projection images projected on the top plate 403a and the top plate 403b, respectively. In the state in which the top plate 403a and the top plate 403b are connected with substantially no gap, the projection image 411a and the projection image 411b are projected as one continuous projection image to the top plate 403a and the top plate 403b.

The projection image 411a and the projection image 411b include images of sticky notes 412a to 412f disposed inside a background image in one plane. The sticky notes 412a to 412f are images in which memos created by the user using a function of the discussion app are described.

If the user performs an operation of sliding his/her fingers with the fingers located near any of the sticky notes 412a to 412f, then the projection position of the sticky note moves in accordance with the operation.

FIG. 39 is a diagram illustrating, as an example, a record including a discussion app in the "app type" field in the action definition table in FIG. 2 stored in the action definition accumulation unit 52 in FIG. 1.

When the user places his/her hands on both sides or the like of the top plate 403a of the table 401a or the top plate 403b of the table 401b during discussion, the app type is a discussion app, the app state is "during discussion", and the trigger is the motion of the user of placing his/her hands on the table.

In this case, the situation corresponds to the record R121 in FIG. 39, the detection processing unit 32 in FIG. 1 causes the graphics display processing unit 31 in FIG. 1 to execute the action in the "action" field of the record R121 in FIG. 39.

Note that in relation to determination of whether the app state is "during discussion" or "after discussion", the graphics display processing unit 31 determines that the app state is "after discussion" in a case in which a user's operation for ending the discussion is performed on the discussion app, for example, or determines that the app state is "during discussion" in a case in which the user's operation for ending the discussion is not performed.

Alternatively, the graphics display processing unit 31 determines that the app state is "during discussion" in a case in which regions of the top plate 403a and the top plate 403b are grouped into a group A and a group B as in FIG. 38 and when sticky notes such as a sticky note 412C and a sticky note 412D are present in regions across both the groups since which of the groups the sticky notes in the regions across both the groups belongs to has not been confirmed, or the graphics display processing unit 31 determines that the app state is "during discussion" in a case in which sticky notes are not present in regions across both the groups.

Figure 40:
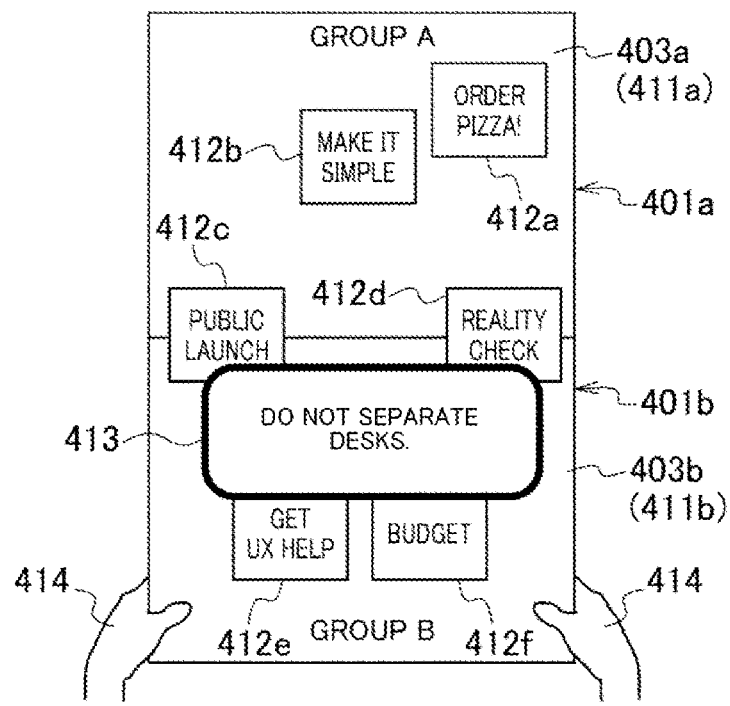
FIG. 40 is a diagram illustrating, as an example, states of the top plates and a projection image when an action of a record R121 in FIG. 39 is executed.

FIG. 40 is a diagram illustrating, as an example, states of the top plate 403a, the top plate 403b, the projection image 411a, and the projection image 411b when the action of the record R121 in FIG. 39 is executed.

In a case in which the action of the record R121 is executed by the user placing his/her hands 414 on both sides of the top plate 403b, an image obtained by superimposing alert information 413 of a text image such as "Discussion is currently carried out. Please do not separate the tables." or "Do not separate the desks." on the projection image 411b is projected.

In this manner, the user is encouraged to pay attention not to move the table during the discussion.

In a case in which the user separates the table 401b from the table 401a as in FIG. 40 regardless of the presentation of the alert information 413, the app type is a discussion app, the app state is "during discussion", and the trigger is a change in position of the table 401b (a state change in which the tables are separated).

In this case, the situation corresponds to the record R122 in FIG. 39, the detection processing unit 32 in FIG. 1 causes the graphics display processing unit 31 in FIG. 1 to execute the action in the "action" field of the record R122 in FIG. 39.

Figure 41:
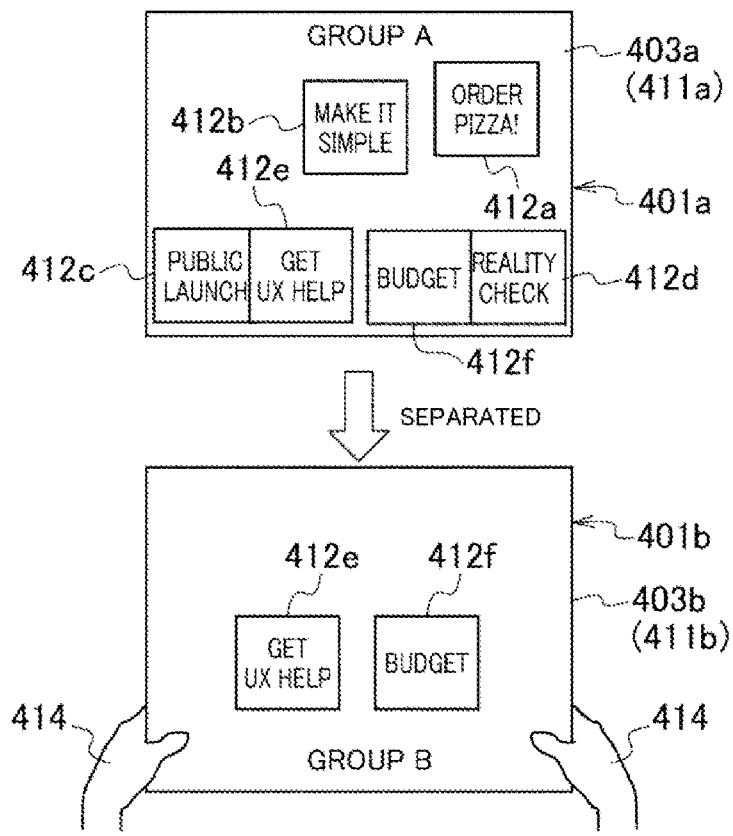
FIG. 41 is a diagram illustrating, as an example, states of the top plates and a projection image when an action of a record R122 in FIG. 39 is executed.

FIG. 41 is a diagram illustrating, as an example, states of the top plate 403a, the top plate 403b, the projection image 411a, and the projection image 411b when the action of the record R122 in FIG. 39 is executed.

In a case in which the action of the record R122 is executed by the top plate 403b being separated from the top plate 403a, copies of the sticky notes 412c, 412d, 412e, and 412f projected on the top plate 403b of the table 401b are projected on the top plate 403a on the table 401a.

To the top plate 403b of the table 401b, the sticky notes 412e and 412f the entireties of which have been projected on the top plate 403b are projected on the top plate 403b as they are.

If the sticky notes 412c and 412d, only parts of which have been projected on the top plate 403b, that is, the sticky notes in the region of the top plate 403a are defined as a group A, and sticky notes in the region of the top plate 403b are defined as a group B, then the sticky notes 412c and 412d in the ranges across both the regions of the top plate 403a and the top plate 403b are projected only to the top plate 403a as sticky notes in the group A and are not projected on the top plate 403b. However, the sticky notes 412c and 412d may also be projected on the top plate 403b.

Note that as the action of the record R122 in FIG. 39 in a case in which the table 401b is separated from the table 401a during discussion, all the sticky notes may be projected on each of the top plate 403a of the table 401a and the top plate 403b of the table 401b (another example 1 of the action of the record R122), or the sticky notes that have been projected on the top plate of the other table may be projected as icons (with reduced sizes) (another example 2 of the action of the record R122), or only the sticky notes that have been projected on each table may be projected (another example 3 of the action of the record R122).

Figure 42:
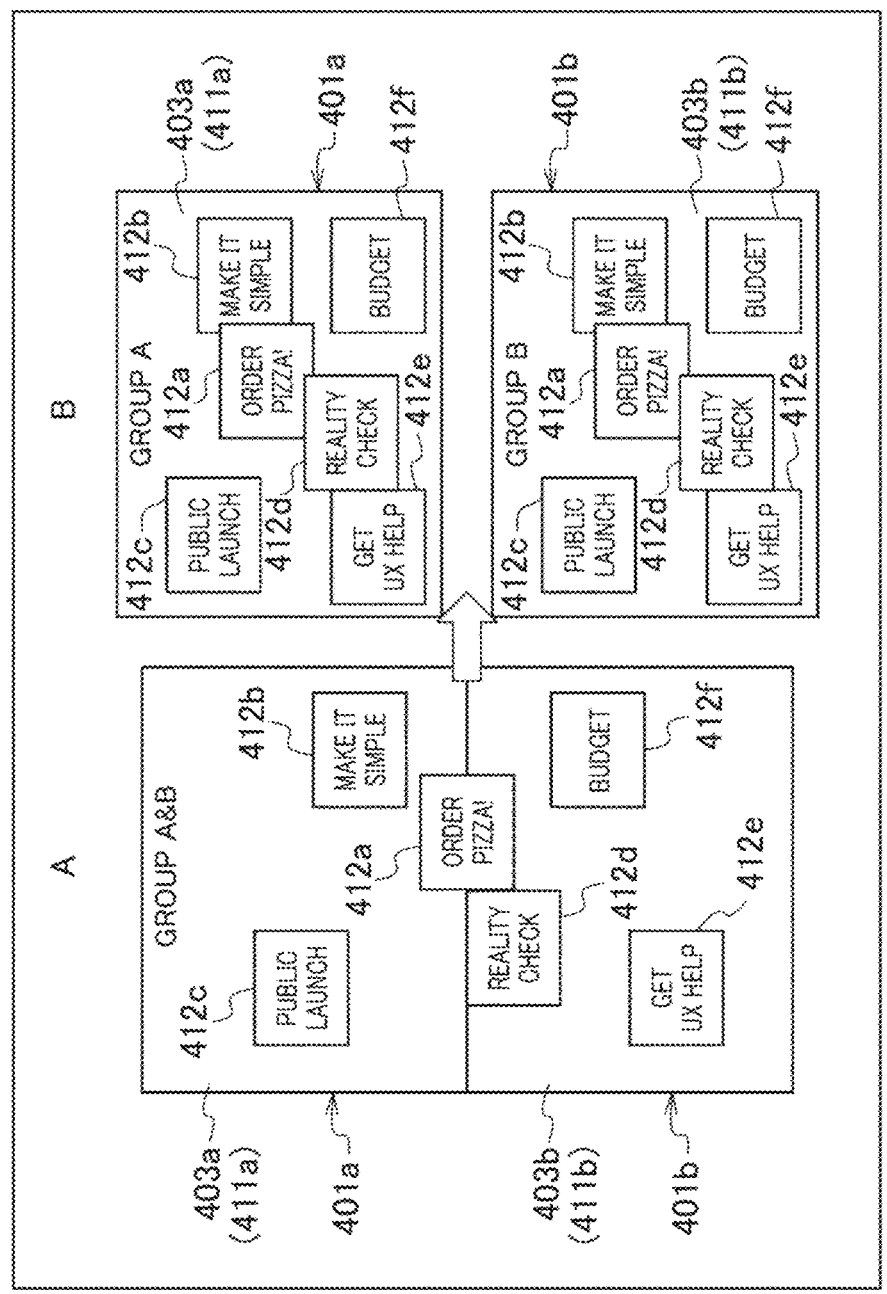
FIG. 42 is a diagram for explaining another example 1 of the action of the record R122 in FIG. 39.

FIG. 42 is a diagram for explaining another example 1 of the action of the record R122 in FIG. 39.

A in FIG. 42 illustrates, as an example, the projection image 411a on the top plate 403a and the projection image 411b on the top plate 403b when the table 401a and the table 401b are connected.

In A in FIG. 42, the sticky notes 412a to 412f are projected on the top plate 403a and the top plate 403b.

B in FIG. 42 represents the projection image 411a on the top plate 403a and the projection image 411b on the top plate 403*b* when another example 1 of the action of the record R122 is executed in the case in which the table 401*a* and the table 401*b* are separated from the state in A in FIG. 42.

In B in FIG. 42, all the sticky notes 412*a* to 412*f* that have been included in the projection image 411*a* on the top plate 403*a* and the projection image 411*b* on the top plate 403*b* in A in FIG. 42 are projected with the mutual relative positions maintained as they are on the top plate 403*a* and the top plate 403*b*.

Figure 43:
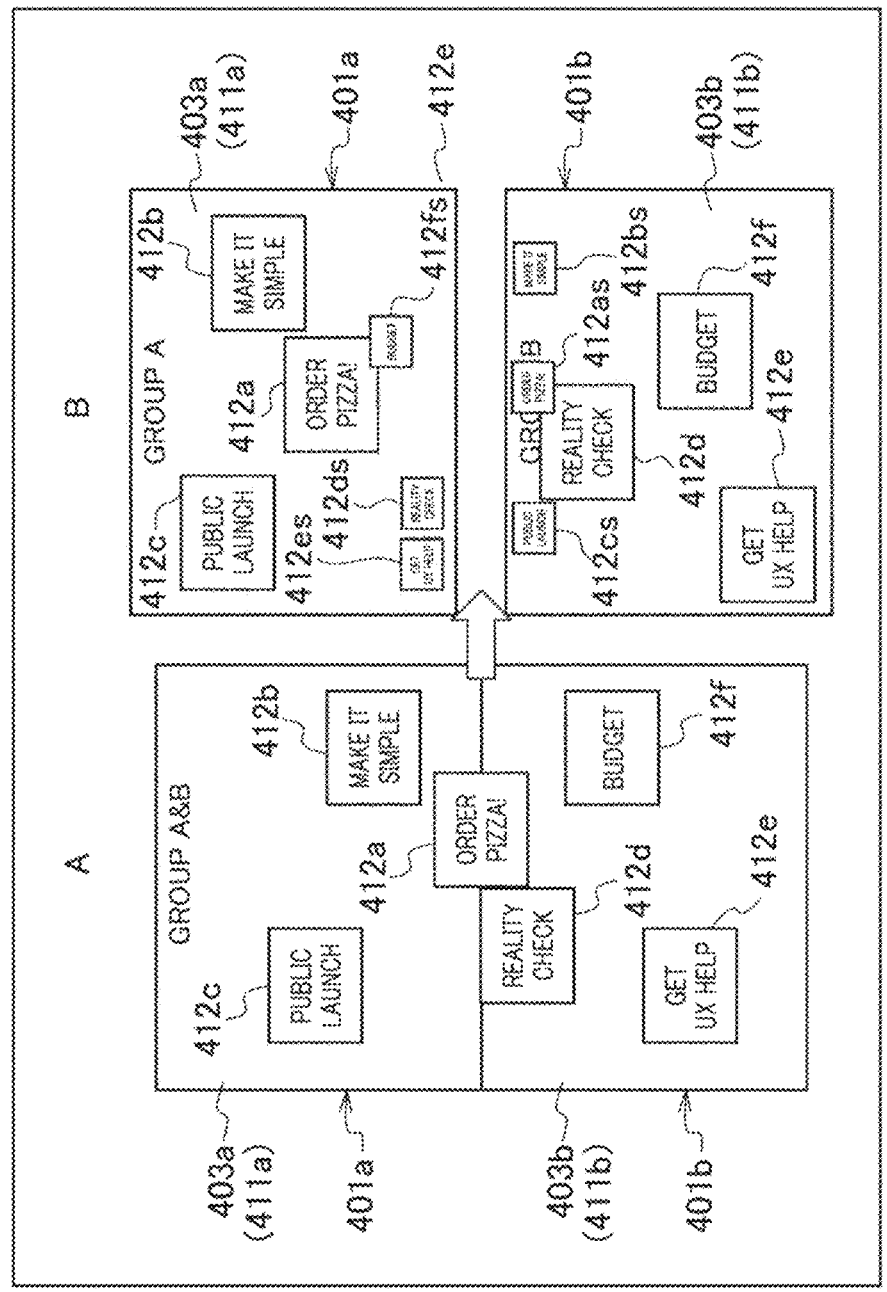
FIG. 43 is a diagram for explaining another example 2 of the action of the record R122 in FIG. 39.

FIG. 43 is a diagram for explaining another example 2 of the action of the record R122 in FIG. 39.

A in FIG. 43 illustrates, as an example, the projection image 411*a* on the top plate 403*a* and the projection image 411*b* on the top plate 403*b* when the table 401*a* and the table 401*b* are connected. Since A in FIG. 43 is the same as A in FIG. 42, description thereof will be omitted.

B in FIG. 43 represents the projection image 411*a* on the top plate 403*a* and the projection image 411*b* on the top plate 403*b* when another example 2 of the action of the record R122 is executed in the case in which the table 401*a* and the table 401*b* are separated from the state in A in FIG. 42.

In B in FIG. 43, the sticky notes 412*a* to 412*c* that have been projected on the top plate 403*a* in the state in A in FIG. 43 are projected on the top plate 403*a*. Note that in a case of a sticky note in a range across regions of both the top plate 403*a* and the top plate 403*b* in the state in A in FIG. 43 as the sticky note 412*a*, the sticky note is regarded as a sticky note projected on the top plate that the sticky note closes a larger area out of the regions of the top plate 403*a* and the top plate 403*b*, for example.

Also, sticky notes 412*ds*, 412*es*, and 412*fs* as icons (with reduced sizes) of the sticky notes 412*d* to 412*f* that have been projected on the top plate 403*b* in A in FIG. 42 are projected on the top plate 403*a* of the table 401*a*.

The sticky notes 412*d* and 412*f* that have been projected on the top plate 403*b* in the state in A in FIG. 43 are projected on the top plate 403*b* of the table 401*b*.

Also, sticky notes 412*as*, 412*bs*, and 412*cs* as icons (with reduced sizes) of the sticky notes 412*a* to 412*c* that have been projected on the top plate 403*a* of the table 401*a* in A in FIG. 43 are projected on the top plate 403*b* of the table 401*b*.

Figure 44:
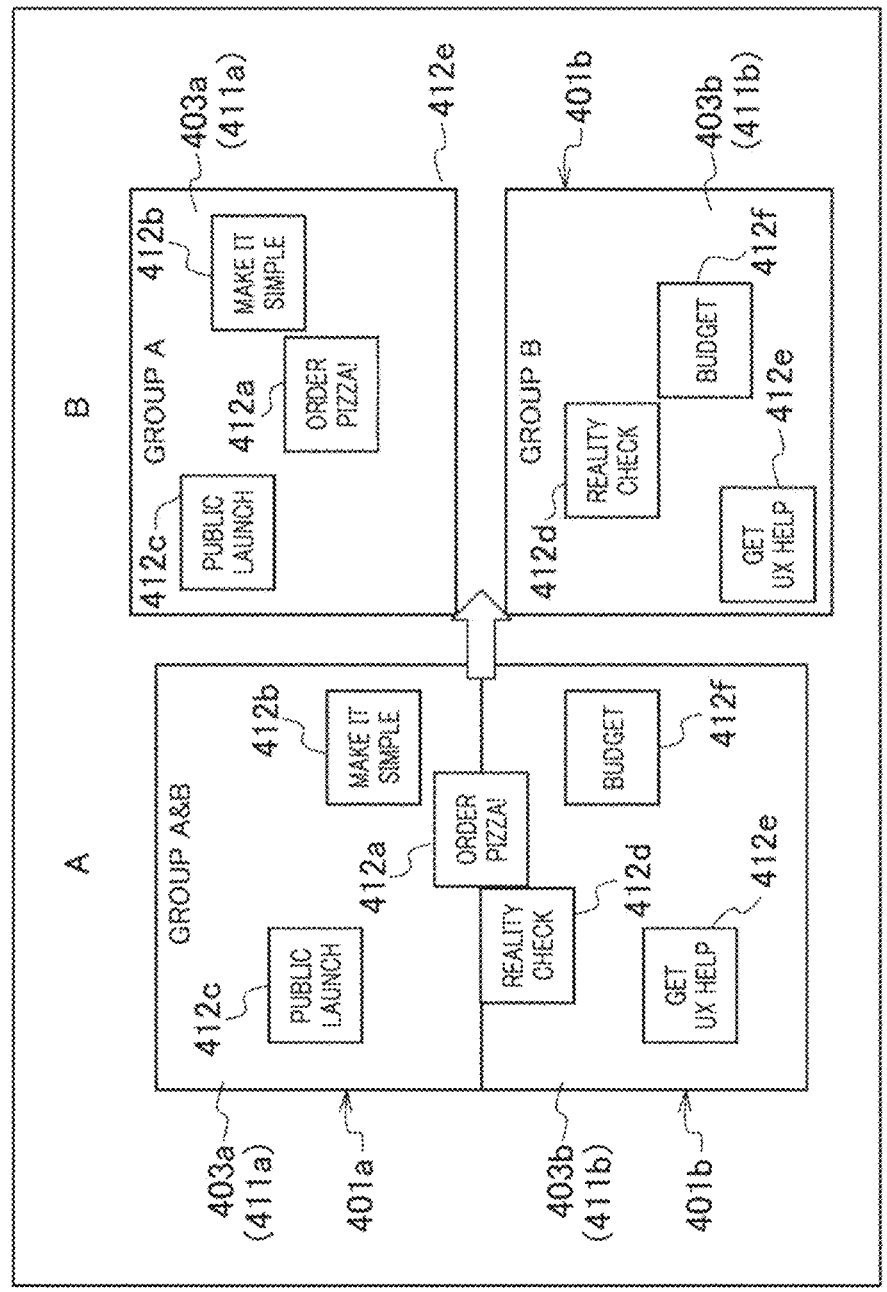
FIG. 44 is a diagram explained by another example 3 of the action of the record R122 in FIG. 39.

FIG. 44 is a diagram for explaining another example 3 of the action of the record R122 in FIG. 39.

A in FIG. 44 illustrates, as an example, the projection image 411*a* on the top plate 403*a* and the projection image 411*b* on the top plate 403*b* when the table 401*a* and the table 401*b* are connected. Since A in FIG. 44 is the same as A in FIG. 42, description thereof will be omitted.

B in FIG. 44 represents the projection image 411*a* on the top plate 403*a* and the projection image 411*b* on the top plate 403*b* when another example 3 of the action of the record R122 is executed in the case in which the table 401*a* and the table 401*b* are separated from the state in A in FIG. 44.

In B in FIG. 44, the sticky notes 412*a* to 412*c* that have been projected on the top plate 403*a* in the state in A in FIG. 44 are projected on the top plate 403*a*.

Note that in a case of a sticky note in a range across regions of both the top plate 403*a* and the top plate 403*b* in the state in A in FIG. 44 as the sticky note 412*a*, the sticky note is regarded as a sticky note projected on the top plate that the sticky note closes a larger area out of the regions of the top plate 403*a* and the top plate 403*b*, for example.

The sticky notes 412*d* to 412*f* that have been projected on the top plate 403*b* in the state in A in FIG. 44 are projected on the top plate 403*b* of the table 401*b*.

Note that when the user separates the table 401*a* from the table 401*b* after the discussion ends, the app type is a discussion app, the app state is "after discussion", and the trigger is a change in position of the table 401*b* (a state change in which the tables have been separated).

In this case, the situation corresponds to the record R123 in FIG. 39, the detection processing unit 32 in FIG. 1 causes the graphics display processing unit 31 in FIG. 1 to execute the action in the "action" field of the record R123 in FIG. 39.

In the action of the record R123, the detection processing unit 32 does nothing in response to the separation of the tables.

Note that although the action definition table in FIG. 39 does not include explicit indication, the detection processing unit 32 in FIG. 1 changes the position or the like of the app window where the presentation information is projected with movement of the top plates of the tables and projects the projection image such that the top plates of the table are always used as the presentation locations of the presentation information regardless of which of the actions of the records R121 to R123 is executed.

Note that the action in the "action" field of the record R121 to R123 in the action definition table in FIG. 39 can be applied as an action for an arbitrary type of app and an arbitrary presentation location (not limited to tables as well) with an "app state" field and a "trigger" field that can be categorized into a combination similar to that of the records R121 to R123.

<Other Embodiments>

The information processing device 11 in FIG. 1 projects presentation information generated through processing of an app or the like to a movable or unmovable presentation location using a projector of the output unit 24. On the other hand, a flat panel or a flexible image display (such as a liquid crystal display or an organic electroluminescence (EL)) may be provided as the output unit 24 on a surface of a movable or unmovable member that can be a movable or unmovable presentation locations as a component of the output unit 24, and the presentation information from the arithmetic operation unit 22 may be displayed on the image display as the presentation location.

In the information processing device 11 in FIG. 11, at least the arithmetic operation unit 22 out of the arithmetic operation unit 22 and the storage unit 23 may be a server device communicably connected to the input unit 21 and the output unit 24 through a communication line such as the Internet. The communication line may be wireless or wired, and a wireless communication line and a wired communication line may be present together.

<Program>

A part or entirety of the processing of the graphics display processing unit 31 and the detection processing unit 32 performed by the information processing device 11 in FIG. 1 can be executed by hardware or can be executed by software. When the series of processing is executed by software, a program including the software is installed in a computer. Here, the computer includes, for example, a computer built into dedicated hardware, a general-purpose personal computer that can execute various functions through installation of various programs.

Figure 45:
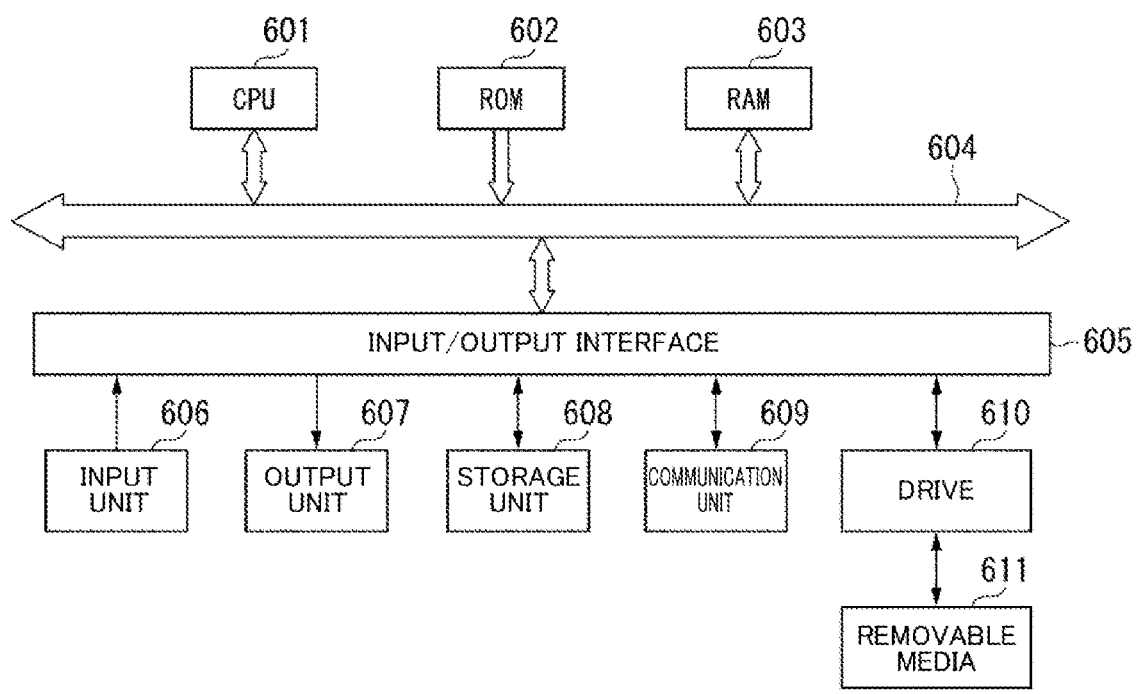
FIG. 45 is a block diagram illustrating an example of a hardware configuration of a computer that executes a series of processing using a program.

FIG. 45 is a block diagram illustrating a configuration example of hardware of a computer that executes the aforementioned series of processing using a program.

In the computer, a central processing unit (CPU) 601, a read-only memory (ROM) 602, and a random access memory (RAM) 603 are connected to each other by a bus 604.

An input/output interface 605 is further connected to the bus 604. An input unit 606, an output unit 607, a storage unit 608, a communication unit 609, and a drive 610 are connected to the input/output interface 605.

The input unit 606 is constituted by a keyboard, a mouse, a microphone, or the like. The output unit 607 is a display, a speaker, or the like. The storage unit 608 is constituted by a hard disk, a non-volatile memory, or the like. The communication unit 609 is a network interface or the like. The drive 610 drives a removable medium 611 such as a magnetic disk, an optical disc, a magneto-optical disk, or a semiconductor memory.

In the computer that has the foregoing configuration, the CPU 601 performs the above-described series of processing, for example, by loading a program stored in the storage unit 608 on the RAM 603 via the input/output interface 605 and the bus 604 and executing the program.

The program executed by the computer (the CPU 601) can be recorded on and provided as, for example, the removable medium 611 serving as a package medium. The program can be provided via a wired or wireless transfer medium such as a local area network, the Internet, or digital satellite broadcasting.

In the computer, by mounting the removable medium 611 on the drive 610, it is possible to install the program in the storage unit 608 via the input/output interface 605. The program can be received by the communication unit 609 via a wired or wireless transfer medium and can be installed in the storage unit 608. In addition, the program can be installed in advance in the ROM 602 or the storage unit 608.

Note that the program executed by the computer may be a program that performs processing chronologically in the order described in the present specification or may be a program that performs processing in parallel or at a necessary timing such as a calling time.

The present technology can also be configured as follows.

<1> An information processing device including: a control unit configured to perform, on the basis of presentation location information regarding a change in state of a presentation location where presentation information is presented and at least one piece of information out of processing information regarding processing for generating the presentation information, user information regarding a response of a user to the processing, and environment information regarding a state of an environment of the presentation location, control of at least one state of a presentation state of the presentation information and a state of the processing.

<2> The information processing device according to <1>, in which the presentation location information is information indicating a change in state of the presentation location or information indicating a motion of the user related to the change in state of the presentation location.

<3> The information processing device according to <2>, in which the motion of the user is a motion of the user operating an operation portion that moves a member including the presentation location or a motion of the user manually moving the member including the presentation location.

<4> the Information Processing Device According to any One of <1> to <3>, in which the Processing Information is Information Indicating a Type of the Processing and Information Indicating a State of the Processing.

<5> The information processing device according to any one of <1> to <4>, in which the user information is information indicating whether or not the user is viewing the presentation information presented in the presentation location or information indicating whether or not the user has performed an operation on the processing.

<6> The information processing device according to any one of <1> to <5>, in which the control unit performs control of the presentation location or control of a presentation form of the presentation information as the control of the presentation state of the presentation information.

<7> The information processing device according to any one of <1> to <6>, in which the presentation location is a location where the presentation information is projected.

<8> The information processing device according to any one of <1> to <7>, in which the presentation location is a surface of a movable member.

<9> The information processing device according to <8>, in which the movable member is a member of a vehicle.

<10> The information processing device according to <8>, in which the movable member is a table.

<11> The information processing device according to any one of <1> to <9>, in which in a case where the processing information indicates that the state of the processing is a state where replaying is being performed and the presentation location information indicates that a change in state of the presentation location has occurred, the control unit causes the processing to stop.

<12> The information processing device according to <11>, in which in a case where the processing information indicates that the state of the processing is a state where replaying at a specific volume or more is being performed, the control unit causes the processing to stop.

<13> The information processing device according to claim 1 according to any one of <1> to <9>, in which in a case where the processing information indicates that the state of the processing is a state where replaying is being performed, and the presentation location information indicates that a motion of the user to cause a change in state of the presentation location has been performed, the control unit causes alert information to be presented at the presentation location.

<14> The information processing device according to <9>, in which in a case where the environment information indicates that the vehicle is traveling, and the presentation location information indicates that a motion of the user to cause a change in state of the presentation location has been performed, the control unit causes alert information to be presented at the presentation location.

<15> The information processing device according to <9>, in which in a case where the environment information indicates that the vehicle is traveling, and the presentation location information indicates that a motion of the user to cause a change in state of the presentation location has been performed, the control unit locks the member of the presentation location.

<16> The information processing device according to any one of <1> to <9>, in which the presentation information includes a video, in a case in which the processing information indicates that a state of the processing is a state where replaying of the video is being performed, and the presentation location information indicates that a change in state of the presentation location has occurred, the control unit changes the presentation location where the video is presented.

<17> The information processing device according to any one of <1> to <9>, in which in a case where the user information indicates that the user is performing an operation on the processing, or in a case in which the user information indicates that the user is viewing the presentation information presented at the presentation location, the control unit changes the presentation location where the presentation information is presented when the presentation location information indicates that a change in state of the presentation location has occurred.

<18> The information processing device according to <10>, in which the presentation information includes a sticky note presented in a discussion, in a case in which the processing information indicates that a state of the processing is a state where the discussion is being performed, and the presentation location information indicates that a change in state of the presentation location has occurred, the control unit changes a position within a range of the presentation location where the sticky note is presented.

<19> An information processing method including, by a control unit of an information processing device including the control unit: performing, on the basis of presentation location information regarding a change in state of a presentation location where presentation information is presented and at least one piece of information out of processing information regarding processing for generating the presentation information, user information regarding a response of a user to the processing, and environment information regarding a state of an environment of the presentation location, control of at least one state of a presentation state of the presentation information and a state of the processing.

<20> A program that causes a computer to function as a control unit that performs, on the basis of presentation location information regarding a change in state of a presentation location where presentation information is presented and at least one piece of information out of processing information regarding processing for generating the presentation information, user information regarding a response of a user to the processing, and environment information regarding a state of an environment of the presentation location, control of at least one state of a presentation state of the presentation information and a state of the processing.

REFERENCE SIGNS LIST

11 Information processing device
21 Input unit
23 Storage unit
24 Output unit
31 Graphics display processing unit
32 Detection processing unit
41 Input information analysis unit
42 Application execution unit
43 Display control unit
51 Action execution unit
52 Action definition accumulation unit
53 Urgency level definition accumulation unit
54 App state definition accumulation unit

The invention claimed is:

1. An information processing device comprising:
circuitry configured to perform control of a presentation state of presentation information,
wherein the circuitry performs the control based on
presentation location information regarding a change in state of a presentation location where the presentation information is presented,
processing information regarding processing for generating the presentation information,
user information regarding a response of a user to the processing, and
environment information regarding a state of an environment of the presentation location,
wherein the presentation location is a movable presentation location,
wherein the presentation location information includes information indicating a motion of the user that causes the change in state of the presentation location related to movement of a member including the presentation location,
wherein the circuitry performs control of the presentation location of the presentation information as the control of the presentation state of the presentation information, and
wherein the circuitry performs the control of the presentation location of the presentation information according to an urgency level determined for the change in state of the presentation location.

2. The information processing device according to claim 1,
wherein the motion of the user includes a motion of the user operating an operation portion that moves the member including the presentation location or a motion of the user manually moving the member including the presentation location.

3. The information processing device according to claim 1,
wherein the processing information is information indicating a type of the processing and information indicating a state of the processing.

4. The information processing device according to claim 1,
wherein the user information is information indicating whether or not the user is viewing the presentation information presented in the presentation location or information indicating whether or not the user has performed an operation on the processing.

5. The information processing device according to claim 1,
wherein the circuitry further performs control of a presentation form of the presentation information as the control of the presentation state of the presentation information.

6. The information processing device according to claim 1,
wherein the presentation location is a location where the presentation information is projected.

7. The information processing device according to claim 1,
wherein the presentation location is a surface of a movable member.

8. The information processing device according to claim 7,
wherein the movable member is a part of a vehicle.

9. The information processing device according to claim 7,
wherein the movable member is a table.

10. The information processing device according to claim 1,
wherein, in a case in which the processing information indicates that the state of the processing is a state where replaying is being performed and the presentation location information indicates that a change in state of the presentation location has occurred, the circuitry causes the processing to stop.

11. The information processing device according to claim 10, wherein, in a case in which the processing information indicates that the state of the processing is a state where replaying at a specific volume or more is being performed, the circuitry causes the processing to stop.

12. The information processing device according to claim 1,
wherein, in a case in which the processing information indicates that the state of the processing is a state where replaying is being performed and the presentation location information indicates that a motion of the user to cause a change in state of the presentation location has been performed, the circuitry causes alert information to be presented at the presentation location.

13. The information processing device according to claim 8,
wherein, in a case in which the environment information indicates that the vehicle is traveling and the presentation location information indicates that a motion of the user to cause a change in state of the presentation location has been performed, the circuitry causes alert information to be presented at the presentation location.

14. The information processing device according to claim 8,
wherein, in a case in which the environment information indicates that the vehicle is traveling, and the presentation location information indicates that a motion of the user to cause a change in state of the presentation location has been performed, the circuitry locks the member of the presentation location.

15. The information processing device according to claim 1,
wherein the presentation information includes a video, in a case in which the processing information indicates that a state of the processing is a state where replaying of the video is being performed, and the presentation location information indicates that a change in state of the presentation location has occurred, the circuitry changes the presentation location where the video is presented.

16. The information processing device according to claim 1,
wherein, in a case in which the user information indicates that the user is performing an operation on the processing, or in a case in which the user information indicates that the user is viewing the presentation information presented at the presentation location, the circuitry changes the presentation location where the presentation information is presented when the presentation location information indicates that a change in state of the presentation location has occurred.

17. The information processing device according to claim 9,
wherein the presentation information includes a sticky note presented in a discussion, in a case in which the processing information indicates that a state of the processing is a state where the discussion is being performed, and the presentation location information indicates that a change in state of the presentation location has occurred, the circuitry changes a position within a range of the presentation location where the sticky note is presented.

18. An information processing method comprising, by at least one processor of an information processing device including the at least one processor:
performing control of a presentation state of presentation information,
wherein the control is performed based on
presentation location information regarding a change in state of a presentation location where the presentation information is presented,
processing information regarding processing for generating the presentation information,
user information regarding a response of a user to the processing, and
environment information regarding a state of an environment of the presentation location,
wherein the presentation location is a movable presentation location,
wherein the presentation location information includes information indicating a motion of the user that causes the change in state of the presentation location related to movement of a member including the presentation location,
wherein the presentation location of the presentation information is controlled as the control of the presentation state of the presentation information, and
wherein the presentation location of the presentation information is controlled according to an urgency level determined for the change in state of the presentation location.

19. A non-transitory computer-readable storage medium having embodied thereon a program, which when executed by a computer causes the computer to execute a method, the method comprising:
performing control of a presentation state of presentation information,
wherein the control is performed based on
presentation location information regarding a change in state of a presentation location where the presentation information is presented,
processing information regarding processing for generating the presentation information,
user information regarding a response of a user to the processing, and
environment information regarding a state of an environment of the presentation location,
wherein the presentation location is a movable presentation location,
wherein the presentation location information includes information indicating a motion of the user that causes the change in state of the presentation location related to movement of a member including the presentation location,
wherein the presentation location of the presentation information is controlled as the control of the presentation state of the presentation information, and
wherein the presentation location of the presentation information is controlled according to an urgency level determined for the change in state of the presentation location.

20. The information processing device according to claim 1,
wherein the processing information includes information indicating a type of application generating the presentation information.

21. The information processing device according to claim 20,
wherein the urgency level is determined for the change in state of the presentation location based on the type of application generating the presentation information.

* * * * *